(12) United States Patent
Shokaku et al.

(10) Patent No.: US 11,299,138 B2
(45) Date of Patent: Apr. 12, 2022

(54) HYBRID VEHICLE CONTROL DEVICE

(71) Applicant: HONDA MOTOR CO., LTD., Tokyo (JP)

(72) Inventors: Isao Shokaku, Wako (JP); Ryuichi Takao, Wako (JP); Kanichiro Ogiya, Wako (JP); Yoshiaki Nedachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 467 days.

(21) Appl. No.: 16/082,558

(22) PCT Filed: Mar. 3, 2017

(86) PCT No.: PCT/JP2017/008521
§ 371 (c)(1),
(2) Date: Sep. 6, 2018

(87) PCT Pub. No.: WO2017/154778
PCT Pub. Date: Sep. 14, 2017

(65) Prior Publication Data
US 2020/0298820 A1    Sep. 24, 2020

(30) Foreign Application Priority Data
Mar. 8, 2016    (WO) .................. PCT/JP2016/057075

(51) Int. Cl.
*G06F 17/00*     (2019.01)
*B60W 20/00*    (2016.01)
(Continued)

(52) U.S. Cl.
CPC .............. *B60W 20/00* (2013.01); *B60K 6/26* (2013.01); *B60K 6/28* (2013.01); *B60L 3/0046* (2013.01);
(Continued)

(58) Field of Classification Search
CPC ...... B60W 20/00; B60W 10/08; B60W 10/26; B60W 30/192; B60W 2300/36;
(Continued)

(56) References Cited

U.S. PATENT DOCUMENTS 8,917,039 B2 * 12/2014 Yugo ..................... B60L 3/0092
318/139
9,180,826 B2 * 11/2015 Sugimoto ............... H02J 9/061
(Continued)

FOREIGN PATENT DOCUMENTS

| DE | 10021155 | 8/2001 |
|----|----------|--------|
| DE | 102007052750 | 5/2009 |

(Continued)

OTHER PUBLICATIONS

International Search Report and Written Opinion for International Application No. PCT/JP2017/008521 dated May 16, 2017, 11 pages.
(Continued)

*Primary Examiner* — Ronnie M Mancho
(74) *Attorney, Agent, or Firm* — Amin, Turocy & Watson, LLP

(57) ABSTRACT

A control device for a hybrid vehicle, wherein when starting an engine using a first battery, if the residual capacity of the first battery is not enough to start the engine because of the reduced-voltage of the first battery, the engine is started by driving an ACG starter supplied with electricity from a second battery having a voltage rated value different from that of the first battery.

13 Claims, 15 Drawing Sheets

(51) Int. Cl.
  *B60L 58/20* (2019.01)
  *B60K 6/26* (2007.10)
  *B60K 6/28* (2007.10)
  *B60L 3/00* (2019.01)
  *B60W 10/08* (2006.01)
  *B60W 10/26* (2006.01)
  *B60W 30/192* (2012.01)
  *F02N 11/04* (2006.01)
  *F02N 11/08* (2006.01)

(52) U.S. Cl.
  CPC .......... *B60L 58/20* (2019.02); *B60W 10/08* (2013.01); *B60W 10/26* (2013.01); *B60W 30/192* (2013.01); *F02N 11/04* (2013.01); *F02N 11/0866* (2013.01); *B60K 2006/268* (2013.01); *B60W 2300/36* (2013.01); *B60W 2510/0638* (2013.01); *B60W 2510/244* (2013.01); *B60W 2520/10* (2013.01); *B60W 2520/12* (2013.01); *B60W 2710/08* (2013.01); *B60W 2710/242* (2013.01); *B60Y 2200/92* (2013.01); *B60Y 2400/46* (2013.01)

(58) Field of Classification Search
  CPC ... B60W 2510/0638; B60W 2510/244; B60W 2520/10; B60W 2520/12; B60W 2710/08; B60W 2710/242; B60W 10/30; B60L 58/20; B60L 3/0046; B60L 50/16; B60K 6/26; B60K 6/28; B60K 2006/268; B60K 6/485; F02N 11/04; F02N 11/0866; F02N 11/006; F02N 2011/0885; F02N 2011/0896; F02N 2200/061; F02N 2200/063; B60Y 2200/92; B60Y 2400/46; Y02T 10/7072; Y02T 10/70; Y02T 10/62
  USPC .......................................................... 701/22
  See application file for complete search history.

(56) References Cited

U.S. PATENT DOCUMENTS

| | | | |
|---|---|---|---|
| 2006/0028178 | A1* | 2/2006 | Hobbs ................... B60L 8/006 320/128 |
| 2007/0113814 | A1 | 5/2007 | Tamai et al. |
| 2010/0070133 | A1* | 3/2010 | Ishishita ............ H01M 10/486 701/36 |
| 2010/0270976 | A1* | 10/2010 | Tamura ............ H01M 10/6563 320/136 |
| 2010/0305793 | A1 | 12/2010 | Kidston et al. |
| 2011/0093150 | A1* | 4/2011 | Yanagisawa ............. B66F 9/20 701/22 |
| 2011/0115288 | A1 | 5/2011 | Lee |
| 2013/0106320 | A1* | 5/2013 | Yugo ....................... H02J 1/08 318/139 |

FOREIGN PATENT DOCUMENTS

| | | |
|---|---|---|
| JP | 08-182380 | 7/1996 |
| JP | 2000-295710 | 10/2000 |
| JP | 2009-154847 | 12/2007 |
| JP | 2009-154847 | 7/2009 |
| JP | 2011-051545 | 3/2011 |
| JP | 2013-241122 | 12/2013 |

OTHER PUBLICATIONS

International Preliminary Report on Patentability for International Application No. PCT/JP2017/008521 dated Apr. 24, 2018, 22 pages.
Extended European Search Report for European Patent Application No. 17763118.1 dated Feb. 13, 2019.

* cited by examiner

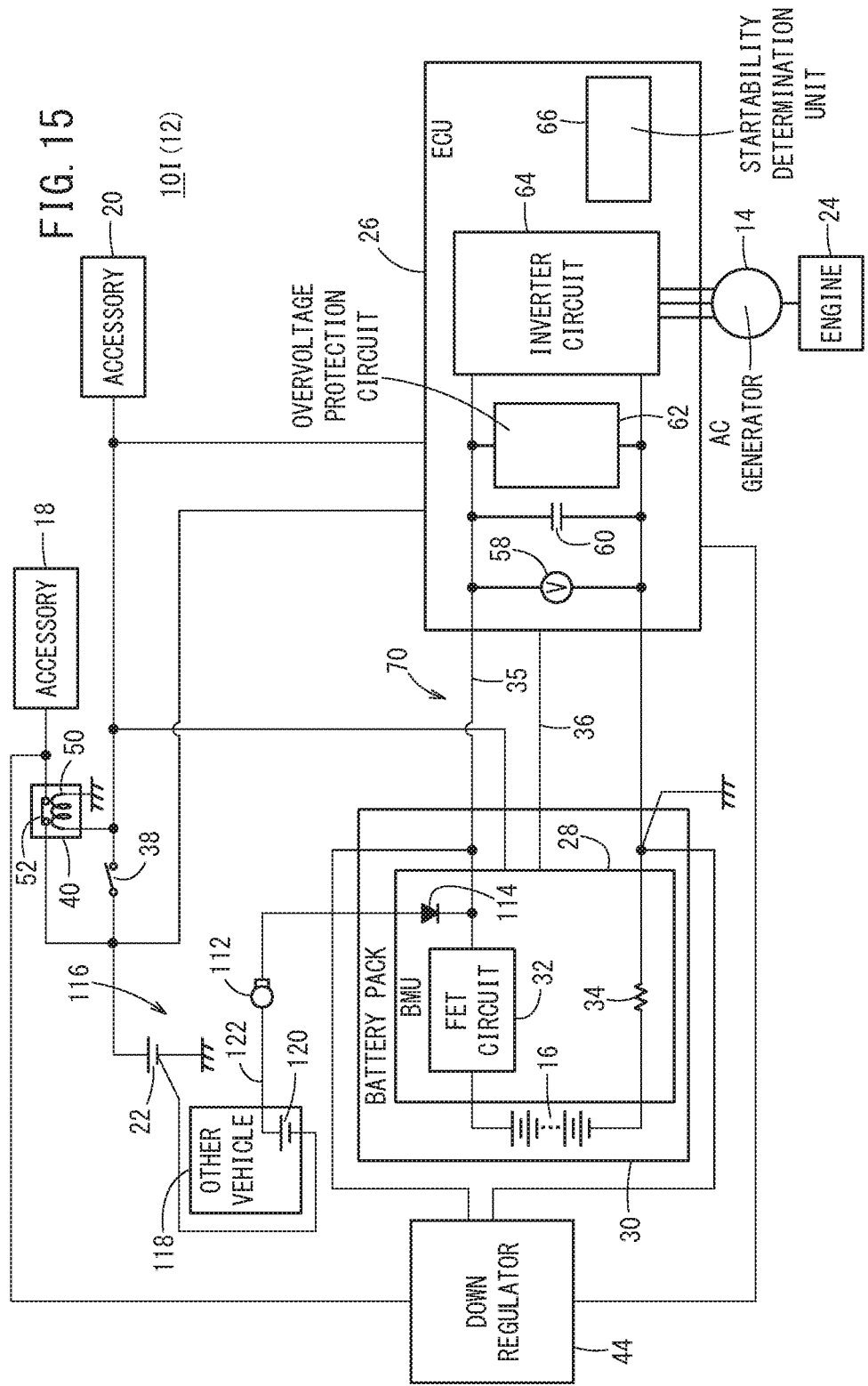

HYBRID VEHICLE CONTROL DEVICE

TECHNICAL FIELD

The present invention relates to a control device for a hybrid vehicle that starts an engine by supplying electric power from a first battery to a driving electric motor while supplying electric power from a second battery to a plurality of accessories.

BACKGROUND ART

In a conventional hybrid vehicle, an engine is started by supplying power from a main battery of high voltage (for example, 48 V system) to an auxiliary motor. On the other hand, in the case of starting the engine at times when the electric power of the main battery is reduced, there are known a method of increasing the voltage of the auxiliary battery of a low voltage (for example, 12 V system) to charge the main battery (see Japanese Laid-Open Patent Publication No. 2009-154847), and a method of providing a starter motor separately from the auxiliary motor and starting the engine with the starter motor with the electric power from the auxiliary battery.

SUMMARY OF INVENTION

As described above, in the conventional technology, it is necessary to provide a step-up converter in order to step up the voltage of the auxiliary battery, or it is necessary to provide a starter motor separate from the auxiliary motor. As a result, the cost becomes high, and a space for installing parts is required.

Accordingly, the present invention provides a hybrid vehicle control device for a hybrid vehicle having an engine and a driving electric motor for assisting the engine, wherein when one of the batteries (main battery) is reduced in power, the driving electric motor is driven and controlled by a voltage of another battery (auxiliary battery) to start the engine.

The hybrid vehicle control device according to the present invention includes a driving electric motor, a first battery that supplies power to the driving electric motor, and a second battery that supplies power to a plurality of accessories, wherein the driving electric motor starts the engine. The hybrid vehicle control device has the following features.

First feature: The control device further includes a backflow prevention unit configured to prevent current flowing from the first battery from flowing back to the second battery. In this case, the first battery is connected to the driving electric motor via a line, while the second battery is connected to the line via the backflow prevention unit. The first battery and the second battery have different rated voltages. The second battery is a battery having a lower voltage than the first battery. the first battery or the second battery having different rated voltages supplies electric power to the driving electric motor to start the engine by supplying, to the driving electric motor, a voltage so converted by a voltage converting unit that the first battery corresponds to a voltage of the second battery.

Second feature: The average value of the supply voltage from the first battery to the driving electric motor and the average value of the supply voltage from the second battery to the driving electric motor are determined to a duty ratio for driving the driving electric motor.

Third feature: The control device further includes a startability determination unit for determining whether the state of the first battery or the second battery is in a state where the engine can be started. When the startability determination unit determines that one of the batteries cannot start the engine, electric power is supplied from another battery to the driving electric motor to start the engine.

Fourth feature: The startability determination unit determines whether the remaining capacity of the first battery or the second battery is a capacity required for starting the engine, the voltage value of the first battery or the second battery is lower than a predetermined set value, or the first battery or the second battery is in a failed state. Then, if the one of the batteries is determined not to be able to start the engine based on any one of following conditions that the remaining capacity of one of the batteries is lower than the required capacity, the voltage value of the one of the batteries is lower than the set value, and the one of the batteries is in the failed state, the startability determination unit starts the engine with the other battery.

Fifth feature: The the first battery supplies electric power to the driving electric motor in preference to the second battery to start the engine in a normal state. When the startability determination unit determines that the engine cannot be started by the first battery, the control device supplies electric power from the second battery to the driving electric motor to start the engine.

Sixth feature: the driving electric motor is driven by supplying, to the driving electric motor from the first battery, a voltage at a duty ratio higher than a duty ratio at a time of starting the engine (24).

Seventh feature: The driving electric motor is driven by supplying the driving electric motor from the first battery with the voltage at a duty ratio higher than the duty ratio at the time of starting the engine, depending on an engine rotating speed or a vehicle speed of the hybrid vehicle.

Eighth feature: The control device further includes permission startability determination unit for determining whether the first battery or the second battery is in a state capable of starting the engine, and a discharging unit for discharging the electric charge caused by the voltage of the first battery accumulated in the driving electric motor, when the startability determination unit judges that the first battery cannot start the engine.

Ninth feature: The control device further includes a detection unit for checking whether or not the electric charge has been discharged by the discharging unit.

Tenth feature: The control device may further include a control unit that drives and controls the driving electric motor; and a battery management unit that monitors a state of the first battery, wherein the detecting unit is equipped in the control unit and the battery management unit.

Eleventh feature: A second battery unit is formed of the second battery and the peripheral circuit of the second battery, and the second battery unit is provided with an external power supply unit configured to be supplied with external electric power to the driving electric motor separately from a terminal of the second battery. Twelfth feature: the first battery or the second battery having different rated voltages supplies electric power to the driving electric motor by supplying, to start the engine (24), the voltage from the second battery. Thirteenth feature: the first battery has a rated voltage more than double a rated voltage of the second battery.

According to the first feature of the present invention, when one of the batteries is reduced in power, power is supplied from the other battery to the driving electric motor via the line, so that the engine is directly started. This eliminates the necessity of providing a boost converter for boosting the voltage of the auxiliary battery and a starter motor separately from the auxiliary motor which are required in the conventional art. As a result, space saving of the control device can be realized while suppressing cost. Further, by the backflow prevention unit, it is possible to prevent the current from the high voltage battery from flowing into the low voltage battery via the line.

Further, it is possible to suppress the frequency of starting the engine with the second battery of the low voltage by prioritizing the starting of the engine by the high voltage first battery. As a result, it is possible to avoid the second battery from running out.

According to the second feature of the present invention, by driving the driving electric motor by the duty ratio, it is possible to start the engine even with a battery having a different rated voltage value. For example, when the first battery is a 48V high-voltage battery, a supply voltage (average value) of 12 V is supplied to the driving electric motor at a duty ratio of 25%, and the engine can be started. On the other hand, when the second battery is a 12V low-voltage battery, a supply voltage (average value) of 12 V is supplied to the driving electric motor at a duty ratio of 100%, and the engine can be started.

According to the third feature of the present invention, when the startability determination unit determines that one of the batteries cannot start the engine, the engine is started by the other battery. As a result, even if the engine cannot be started due to the state of one of the batteries, it is possible to start the engine by supplying electric power from the other battery to the driving electric motor.

According to the fourth feature of the present invention, for one battery, if the remaining capacity is less than the required capacity, the voltage value is lower than the set value, or it is in the failed state, the startability determination unit determines that one of the batteries cannot start the engine, and starts the engine with the other battery. Therefore, even if one of the batteries cannot start the engine due to the reduced power or failed state, it is possible to start the engine by supplying electric power from the other battery to the driving electric motor.

According to the fifth feature of the present invention, by prioritizing the starting of the engine using the high voltage first battery, it is possible to suppress the frequency of starting the engine using the low voltage second battery. As a result, it is possible to avoid the second battery from running out. On the other hand, if the first battery is reduced in power, the engine can be started by supplying electric power from the second battery to the driving electric motor.

According to the sixth feature of the present invention, it is possible to assist rotation of an engine crankshaft.

According to the seventh feature of the present invention, it is possible to assist rotation of an engine crankshaft depending on an engine rotating speed or a vehicle speed of the hybrid vehicle.

According to the eighth feature of the present invention, even if the rated voltages are different between the first battery and the second battery by the discharging unit emitting the electric charge caused by the voltage of the first battery from inside the driving electric motor, it is possible to start the engine by supplying electric power from the second battery to the driving electric motor after the emission of electric charge.

According to the ninth feature of the present invention, it is possible to prevent unintentional application of different voltages to the driving electric motor by using the detection unit.

According to the tenth feature of the present invention, there is no need to provide an independent voltage supply unit externally for driving the detection unit. Thus, there is no need to provide a harness or the like for taking in the detection result of the detection unit, and it is possible to reduce the number of parts.

According to the eleventh feature of the present invention, even when the second battery is reduced in power, it is possible to start the engine by supplying the external electric power to the driving electric motor. According to the twelfth feature of the present invention, it is possible to start up the engine by supply power to the driving electric motor from the second battery when the first battery is reduced in power. According to the thirteenth feature of the present invention, it is possible to install the first battery as a high voltage battery and the second battery as a lower voltage battery in the hybrid vehicle.

BRIEF DESCRIPTION OF DRAWINGS

FIG. 15 is a circuit diagram of a hybrid vehicle including a control device according to a ninth embodiment.

DESCRIPTION OF EMBODIMENTS

The present invention will be described in detail below with preferred embodiments with reference to the accompanying drawings.

Configuration of First Embodiment

The hybrid vehicle control device 10A according to the first embodiment (hereinafter also referred to as the control device 10A according to the first embodiment) will be described with reference to FIGS. 1 to 7B.

Figure 1:
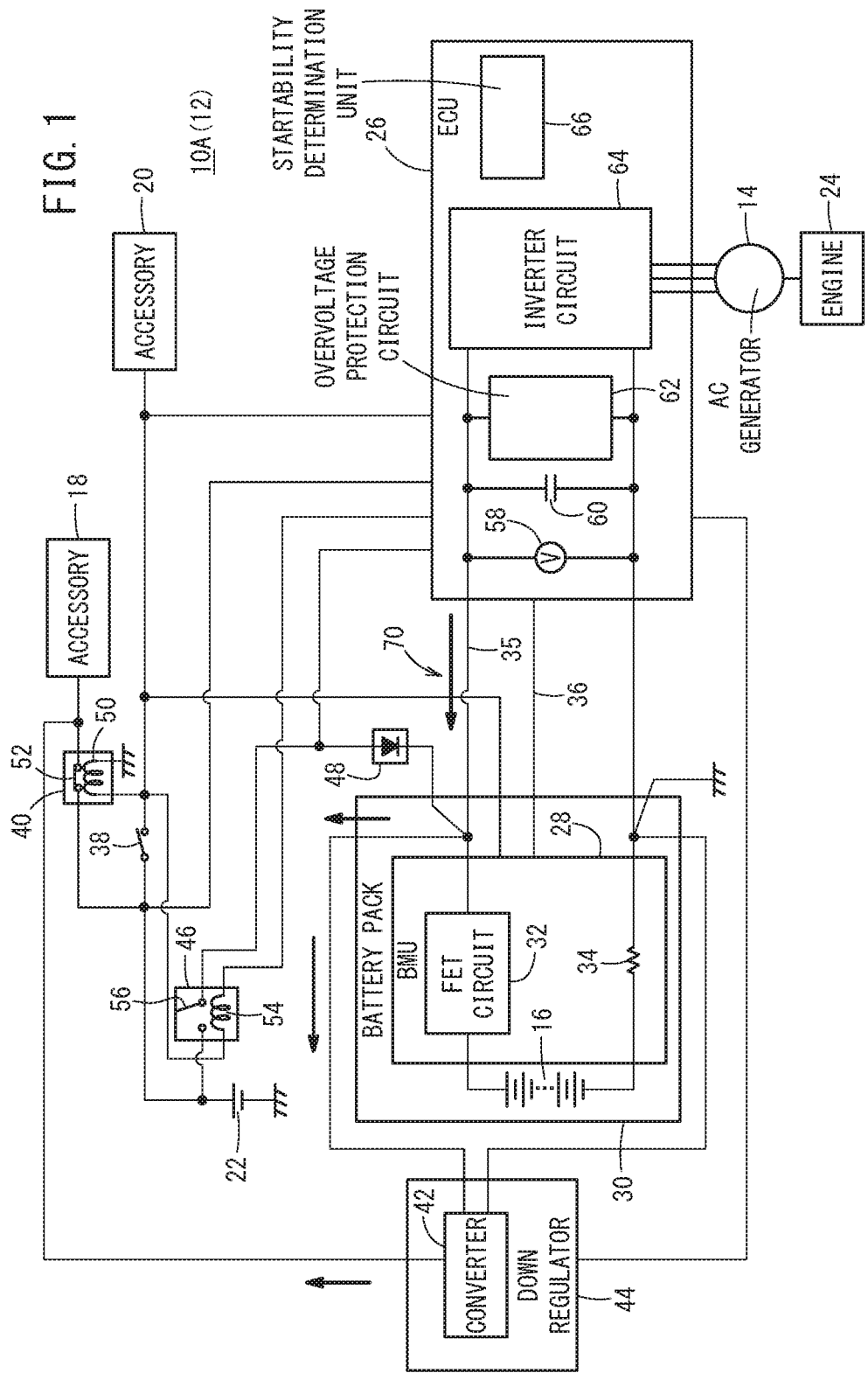
FIG. 1 is a circuit diagram of a hybrid vehicle including a control device according to a first embodiment.

The control device 10A according to the first embodiment shown in FIG. 1 is applied to a hybrid vehicle 12. In the first embodiment, the hybrid vehicle 12 is a straddle-type vehicle (motorcycle).

The hybrid vehicle 12 supplies power to an AC generator 14 (driving electric motor), a first battery 16 of high voltage (for example, 48 V system) for supplying electric power to the AC generator 14, and a second battery 22 of a low voltage (for example, 12 V system) for supplying electric power to a plurality of accessories 18, 20, and an engine 24 to be started by driving of the AC generator 14.

The first battery 16 is a main battery and the second battery 22 is an auxiliary battery. Further, the ECU 26 (control unit) is responsible for drive control of the AC generator 14 and start control of the engine 24. The first battery 16 may be, for example, a Li ion battery, a Ni-MH battery, or a Ni—Cd battery. Further, the second battery 22 may be, for example, a Pb battery.

In the control device 10A, the first battery 16 and the battery management unit (BMU) 28 form a battery pack 30 together. The BMU 28 monitors the state of the first battery 16, and has an FET circuit 32 including an FET and a diode (not shown). In this case, the BMU 28 and the ECU 26 are connected in parallel to the first battery 16, and the FET circuit 32 is connected to the positive electrode side of the first battery 16. The negative electrode side of the first battery 16 is grounded via a resistor 34. By turning on the FET of the FET circuit 32, electric power of the first battery 16 can be supplied from the first battery 16 to the ECU 26 through the FET circuit 32 and the line 35 on the positive electrode side. Signals can be transmitted and received between the BMU 28 and the ECU 26 via the CAN communication line 36. Therefore, the BMU 28 can notify the ECU 26 of the state of charge (remaining capacity, voltage value) of the first battery 16 via the CAN communication line 36.

A main switch 38 is connected to the positive electrode side of the second battery 22. By turning on the main switch 38, a direct current voltage of 12 V is applied from the second battery 22 to the accessory 20, the ECU 26 and the BMU 28 via the main switch 38, and the accessory 20, the ECU 26 and the BMU 28 can be activated. The ECU 26 can monitor the DC voltage of the second battery 22.

The second battery 22 is connected to the accessory 18 and the down regulator 44 having the converter 42 via the main relay 40. In addition, the second battery 22 is connected to the output side of the BMU 28 in the line 35 via the starter relay 46 and the diode 48 (backflow preventing unit).

The main relay 40 has an electromagnetic coil 50 and a normally closed contact 52. The starter relay 46 also has an electromagnetic coil 54 and a normally open contact 56. The normally closed contact 52 connects the positive electrode side of the second battery 22 to the accessory 18 and the converter 42. One end of the electromagnetic coil 50 is grounded, and the other end is connected to the main switch 38. The normally open contact 56 connects the positive electrode side of the second battery 22 to the anode of the diode 48. The electromagnetic coil 54 connects the main switch 38 to the ECU 26.

In this case, in a state where no voltage is applied to the electromagnetic coil 50, the normally closed contact 52 maintains the closed state. As a result, the DC voltage of the second battery 22 is applied to the accessory 18 via the normally closed contact 52, and the accessory 18 can be activated.

Further, in a state where no excitation signal is supplied from the ECU 26 to the electromagnetic coil 54, the normally open contact 56 maintains the open state. On the other hand, when an excitation signal is supplied from the ECU 26 to the electromagnetic coil 54, the normally open contact 56 is switched to the closed state and the second battery 22 is connected to the ECU 26 via the normally open contact 56, the diode 48, and the line 35 to supply power.

The diode 48 has the anode on the side of the second battery 22 and the cathode on the side of the first battery 16. This makes it possible to prevent current from flowing from the high voltage first battery 16 to the low voltage second battery 22. The anode side of the diode 48 is connected to the ECU 26, and the voltage applied to the anode side can be monitored by the ECU 26.

In the converter 42 of the down regulator 44, the positive electrode side is connected to the line 35, and the negative electrode side is grounded. Therefore, the converter 42 steps down the voltage of the line 35 (the DC voltage of the first battery 16), supplies the stepped down voltage to the first battery 16 or the accessory 18 via the normally closed contact 52 of the main relay 40. As a result, it is possible to charge the first battery 16 or drive the accessory 18. Further, the down regulator 44 is connected to the ECU 26, making it possible for the ECU 26 to monitor the down regulator 44.

In the ECU 26, a voltage sensor 58 (detecting unit), a capacitor 60, an overvoltage protection circuit 62 and an inverter circuit 64 (voltage converting unit) are connected in parallel to the BMU 28. The voltage sensor 58 detects the voltage (the voltage of the capacitor 60 in FIG. 1) in the ECU 26.

In the control device 10A, it is also possible to provide a voltage sensor 58 in the BMU 28. In this case, instead of the voltage sensor 58 in the ECU 26, a voltage sensor 58 may be provided in the BMU 28, or a voltage sensor 58 may be provided in both the ECU 26 and the BMU 28. In the case where the voltage sensor 58 is provided in the BMU 28, for example, a voltage sensor 58 may be connected between the line 35 and the ground and the voltage in the ECU 26 (the voltage of the capacitor 60) may be detected via the line 35. Thereby, the BMU 28 can notify the ECU 26 of the voltage value detected by the voltage sensor 58 via the CAN communication line 36. In the following description, a case where the voltage sensor 58 is provided in the ECU 26 will be described.

The inverter circuit 64 includes six FETs (not shown) and forms a three-phase full-wave rectification circuit in which a parasitic diode is formed between the source terminal and the drain terminal of each FET. In this case, when the AC generator 14, which is a three-phase brushless motor generator, is driven and controlled, the DC voltage supplied from the first battery 16 is converted into three-phase AC power, and the converted three-phase AC power is supplied to the AC generator 14 to drive it as a motor. Thereby, it is possible to start the engine 24 or assist the driving force of the engine 24.

On the other hand, at the time of regeneration, the AC generator 14 functions as a generator, the kinetic energy is converted into three-phase AC power, and the three-phase AC power is converted into a DC voltage by the inverter circuit 64. The converted DC voltage is smoothed by the capacitor 60 and charged in the first battery 16.

The ECU 26 performs drive control of the AC generator 14 by switching control of each FET at a predetermined duty ratio.

Further, the ECU 26 includes a startability determination unit 66. The startability determination unit 66 determines whether the remaining capacity of the first battery 16 notified from the BMU 28 via the CAN communication line 36 is such a capacity that the AC generator 14 cannot be driven (start the engine 24). Then, if the startability determination unit 66 determines that the current remaining capacity of the first battery 16 is not enough to start the engine 24, the ECU 26 supplies power from the second battery 22 to the ECU 26 to start the engine 24.

In practice, the capacity of the first battery 16 varies according to the temperature of the first battery 16. Therefore, actually, the temperature of the first battery 16 is detected by a temperature sensor (not shown), and the startability determination unit 66 judges whether or not the remaining capacity of the first battery 16 is the capacity necessary for starting the engine 24 at the temperature. In the following description, it is assumed that the startability determination unit 66 determines whether or not the remaining capacity of the first battery 16 is the capacity necessary for starting the engine 24, in consideration of the temperature of the first battery 16.

Further, in the control device 10A, it is also possible to provide the startability determination unit 66 in the BMU 28. That is, since the BMU 28 monitors the state of the first battery 16, the startability determination unit 66 may be provided in the BMU 28, and determine whether the remaining capacity of the first battery 16 is the capacity required for starting the engine 24 also inside the BMU 28. In this case, the BMU 28 notifies the ECU 26 of the determination result of the startability determination unit 66 via the CAN communication line 36. In the following description, a case where the startability determination unit 66 is provided in the ECU 26 will be described.

Further, the startability determination unit 66 may monitor not only the remaining capacity of the first battery 16 but also the remaining capacity of the second battery 22, and determine whether the remaining capacity of the first battery 16 or the second battery 22 is the capacity required for starting the engine 24. In this case, the voltage value and the current value of the second battery 22 are respectively detected by a voltage sensor and a current sensor (not shown), and the startability determination unit 66 may calculate the remaining capacity of the second battery 22 from the detected voltage value and current value, and perform the above determination processing on the second battery 22.

In addition, the determination processing by the startability determination unit 66 is not limited to the determination processing on the remaining capacity of the first battery 16 or the second battery 22. The startability determination unit 66 may determine whether the state of the first battery 16 or the second battery 22 is ready to start the engine 24. That is, in addition to the above-described remaining capacity, the startability determination unit 66 determines, for example, a determination processing on the voltage value of the first battery 16 or the second battery 22, or the failed state of the first battery 16 or the second battery 22.

In this case, for example, the BMU 28 detects the voltage value of the first battery 16, detects the occurrence of the failed state of the first battery 16, outputs the detection result of the detected voltage value and the occurrence of the failed state, and notifies the ECU 26 via the CAN communication line 36.

In the determination processing for the voltage value of the first battery 16 or the second battery 22, the startability determination unit 66 determines whether or not the voltage value of the first battery 16 or the second battery 22 is lower than a predetermined set value. If the voltage value of one battery is lower than the set value, it is decided to start the engine 24 by the other battery. The predetermined set value is, for example, a battery voltage value sufficient to start the engine 24.

In the determination processing on the failed state of the first battery 16 or the second battery 22, the startability determination unit 66 determines whether the first battery 16 or the second battery 22 is in the failed state. If one battery is in the failed state, it is decided to start the engine 24 by the other battery.

In the following description, a description will be mainly given of the case where the startability determination unit 66 carries out the determination processing on whether or not the remaining capacity of the first battery 16 is the capacity necessary for starting the engine 24.

Here, a case where the engine 24 is started by supplying electric power from the second battery 22 to the ECU 26 based on the judgment by the startability determination unit 66 that the engine 24 cannot be started by the first battery 16 will be specifically described. First, the ECU 26 instructs the BMU 28 to turn off the FET of the FET circuit 32 via the CAN communication line 36. As a result, the FET is turned off, and power supply from the first battery 16 to the ECU 26 is cut off.

In this case, electric charge due to the DC voltage of the first battery 16 is accumulated in the AC generator 14, and this charge is also accumulated in the capacitor 60. The electric charge is discharged from the line 35 connecting the BMU 28 and the ECU 26 via the converter 42 as indicated by an arrow in FIG. 1. That is, the line 35, the converter 42, and the like function as the discharging unit 70 for discharging the electric charge. The electric charge is charged from the converter 42 to the second battery 22 via the normally closed contact 52 of the main relay 40, or is consumed by the accessory 18.

In the ECU 26, the voltage sensor 58 detects the voltage of the capacitor 60. As described above, the charge due to the DC voltage of the first battery 16 accumulated in the AC generator 14 is also accumulated in the capacitor 60. Therefore, the voltage of the capacitor 60 can be regarded as a voltage corresponding to the accumulated charge.

Therefore, the ECU 26 determines whether or not the voltage value of the voltage detected by the voltage sensor 58 is lower than the voltage value at the time when the electric charge is sufficiently discharged by the discharging unit 70 (sufficiently low enough to supply power by the second battery 22 Voltage value) or not is monitored. If it is determined that the electric charge has been sufficiently discharged, the ECU 26 supplies an excitation signal to the electromagnetic coil 54. Thereby, the normally open contact 56 is closed, and electric power can be supplied from the second battery 22 to the ECU 26 via the normally open contact 56, the diode 48, and the line 35. By supplying power from the second battery 22 as such, the AC generator 14 is driven to start the engine 24.

Figure 2:
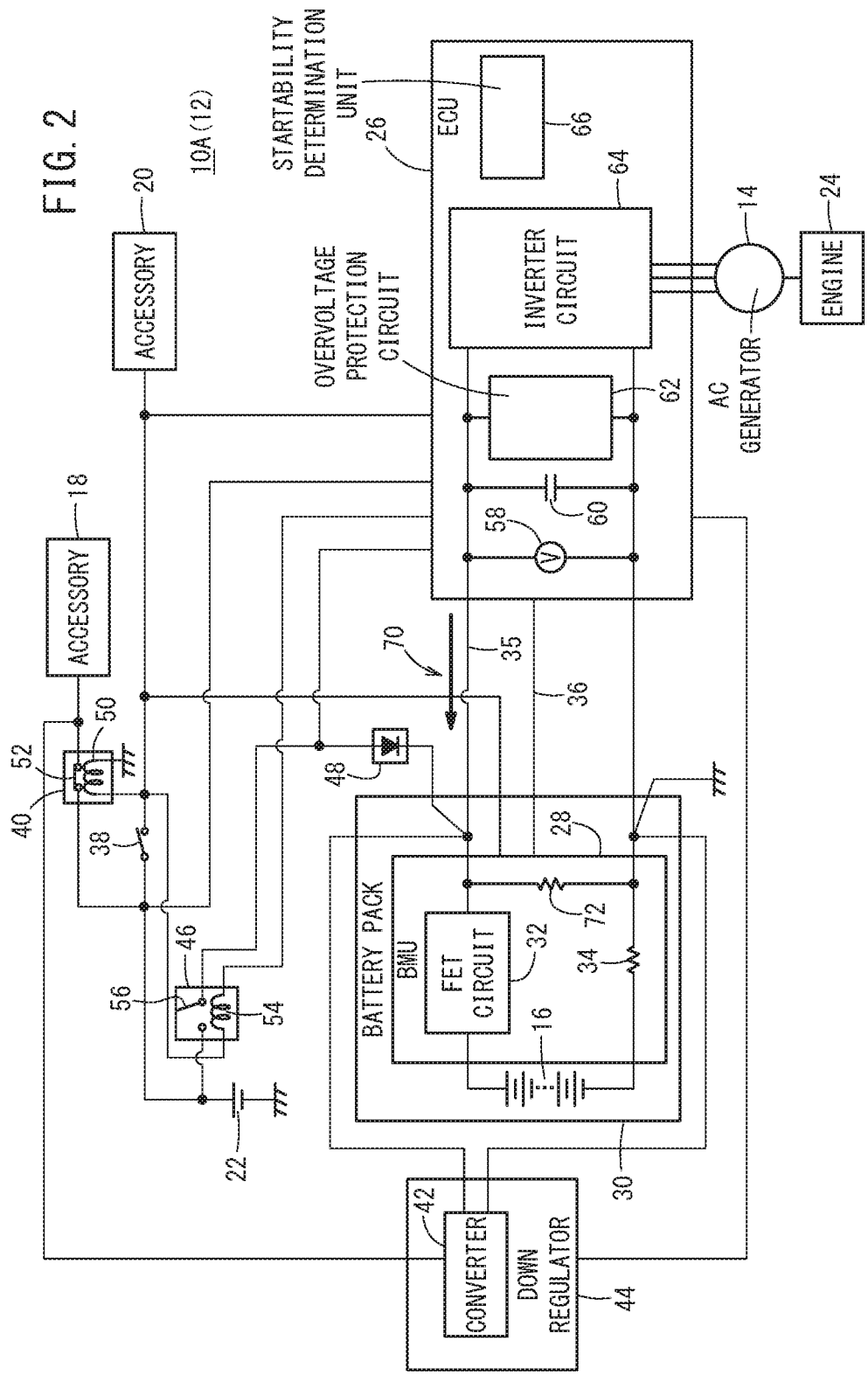
FIG. 2 is a circuit diagram in which a part of the control device in FIG. 1 is modified.
Figure 3:
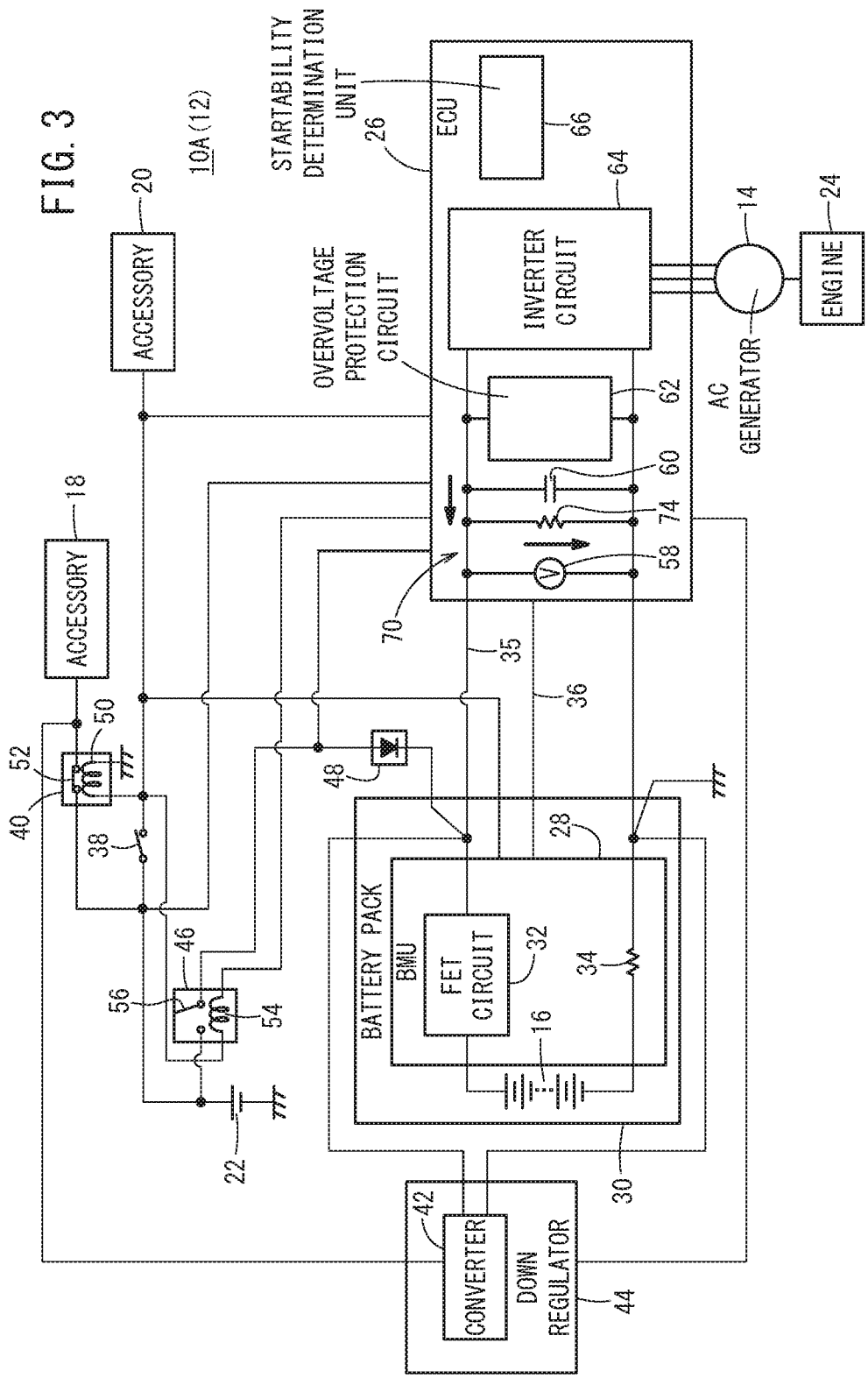
FIG. 3 is a circuit diagram in which a part of the control device in FIG. 1 is modified.

Instead of FIG. 1, the discharging unit 70 may be constructed as shown in FIGS. 2 and 3. FIG. 2 shows a case where the resistor 72 is connected to the output side (ECU 26 side) of the BMU 28, and FIG. 3 shows a case where the resistor 74 is connected in parallel to the capacitor 60 in the ECU 26. In either case, the CR circuit of the capacitor 60 and the resistors 72, 74 can promptly discharge the charge due to the DC voltage of the first battery 16. The charge is discharged along the path indicated by the arrow, in FIGS. 2 and 3.

As long as the electric charge due to the DC voltage of the first battery 16 stored in the AC generator 14 (electric charge accumulated in the capacitor 60) can be discharged, a circuit element used for purposes other than discharging may also be used to discharge the electric charge instead of the discharging unit 70. For example, the electric charges may be consumed by using resistors or loads (not shown) or may be discharged via a line that directly connects the ECU 26 and the down regulator 44.

Operation of First Embodiment

The control device 10A according to the first embodiment is configured as described above. Next, the operation of the control device 10A will be described with reference to FIGS. 4 to 7B. This operation explanation will be described with reference to FIGS. 1 to 3 as necessary.

Here, the operation of the control device 10A from when the driver of the hybrid vehicle 12 turns on the main switch 38 until when the engine 24 is started (cranked) will be described.

First, in step S1, when the driver turns on the main switch 38, power is supplied from the second battery 22 to the ECU 26, the BMU 28, and the accessory 20, and the ECU 26, the BMU 28, and the accessory 20 are activated. Thereby, in step S2, the BMU 28 detects the state of charge (remaining capacity, voltage value) of the first battery 16 and the occurrence of the failed state of the first battery 16 after executing the predetermined initial processing. The detection result of the remaining capacity (SOC), the voltage value, and the presence or absence of the occurrence of the failed state of the first battery 16 are notified from the BMU 28 to the ECU 26 via the CAN communication line 36. After the BMU 28 is activated, the BMU 28 constantly detects the state of charge or the occurrence of the failed state of the first battery 16, and sequentially notifies the ECU 26 via the CAN communication line 36.

In step S3, the startability determination unit 66 of the ECU 26 determines whether or not the notified remaining capacity (SOC) is larger than a predetermined setting value. Note that this set value corresponds to the remaining capacity of the first battery 16 when the first battery 16 cannot start the engine 24. Since the capacity of the first battery 16 varies depending on the temperature of the first battery 16, the startability determination unit 66 determines whether or not the notified SOC is larger than a set value corresponding to the current temperature of the first battery 16.

In step S3, the startability determination unit 66 may determine whether the notified voltage value of the first battery 16 is higher than a predetermined set value. The set value in this case corresponds to the voltage value of the first battery 16 when the first battery 16 cannot start the engine 24. Further, in step S3, the startability determination unit 66 may determine whether the failed state of the first battery 16 has not occurred from the notified detection result.

Accordingly, in step S3, the startability determination unit 66 may perform any one of the above-described three determination processing, or may use a plurality of determination processing in combination. Here, a description will be given of a case where one of the determination processing is executed by the startability determination unit 66.

If it is determined in step S3 that the notified remaining capacity is greater than the set value, if the notified voltage value is higher than the set value or if the failed state has not occurred (step S3: YES), the startability determination unit 66 determines that the engine 24 can be started up under the current remaining capacity of the first battery 16, the current voltage value of the first battery 16, or the current state of the first battery 16. As a result, in the next step S4, the ECU 26 instructs the BMU 28 to turn on the FET of the FET circuit 32 via the CAN communication line 36. Upon receipt of a command from the ECU 26, the BMU 28 turns on the FET of the FET circuit 32. As a result, the first battery 16 can supply electric power to the ECU 26 via the FET circuit 32 and the line 35.

In the next step S5, the startability determination unit 66 judges again whether the notified remaining capacity (SOC) is larger than the set value, whether the notified voltage value is higher than the set value, or from the notified detection result, whether the failed state of the first battery 16 has not occurred from the notified detection result. When the notified remaining capacity is larger than the set value, the notified voltage value is higher than the set value or when the failed state of the first battery 16 has not occurred (step S5: YES), the ECU 26 determines that the engine 24 can be started under the current remaining capacity of the first battery 16, the current voltage value of the first battery 16, or the current state of the first battery 16.

In the next step S6, when the driver turns on the start switch (not shown), in step S7, the ECU 26 drives the AC generator 14 with the electric power supplied from the first battery 16.

Figure 6:
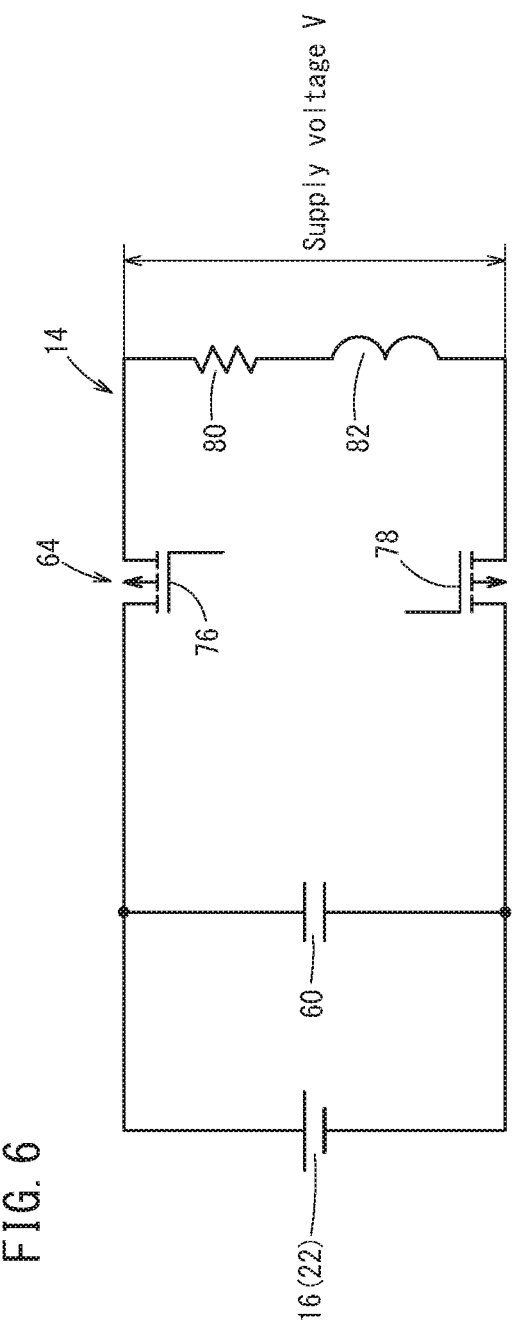
FIG. 6 is a simplified circuit diagram for explaining a PWM operation.

Here, the processing in step S7 will be described with reference to FIGS. 6 and 7A. FIG. 6 is a circuit diagram showing a simplified path from the first battery 16 (or the second battery 22) to the AC generator 14.

In FIG. 6, a capacitor 60 is connected in parallel to the first battery 16. In addition, a series circuit of a resistor 80 and a coil 82 that simulates the AC generator 14 is connected in parallel to the capacitor 60 via the FETs 76 and 78 constituting the inverter circuit 64.

Figure 7A:
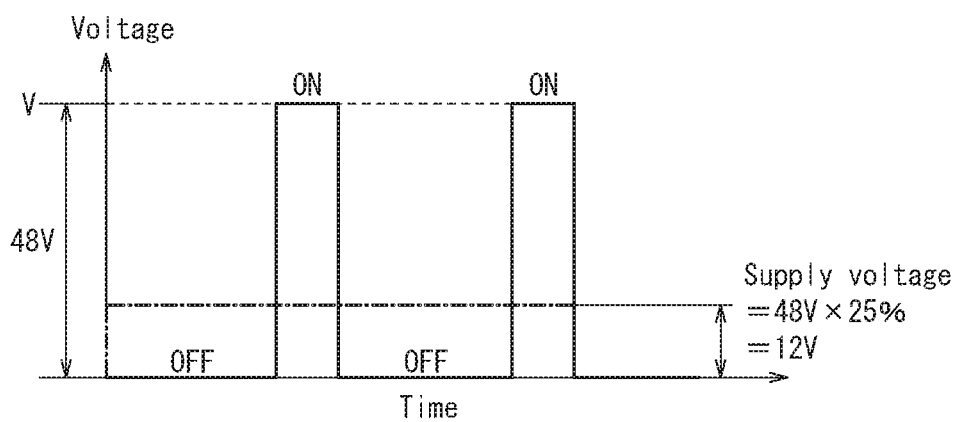
FIG. 7A is a timing chart when the duty ratio is 25% at 48V start.

Here, as shown in FIG. 7A, when the DC voltage of the first battery 16 is set to V=48 V and the FET 76 is turned on while the FET 78 is turned on and off with a duty ratio of 25%, supply voltage applied to (the resistor 80 and the coil 82) of the AC generator 14 becomes a DC voltage (average value) of 48 V×0.25=12 V as indicated by a one-dot chain line. That is, in the first embodiment, when a direct current voltage of 48 V is supplied from the first battery 16 to the inverter circuit 64, driving of the AC generator 14 is controlled with the average value of the supply voltage of 12 V at the duty ratio of 25%.

Figure 4:
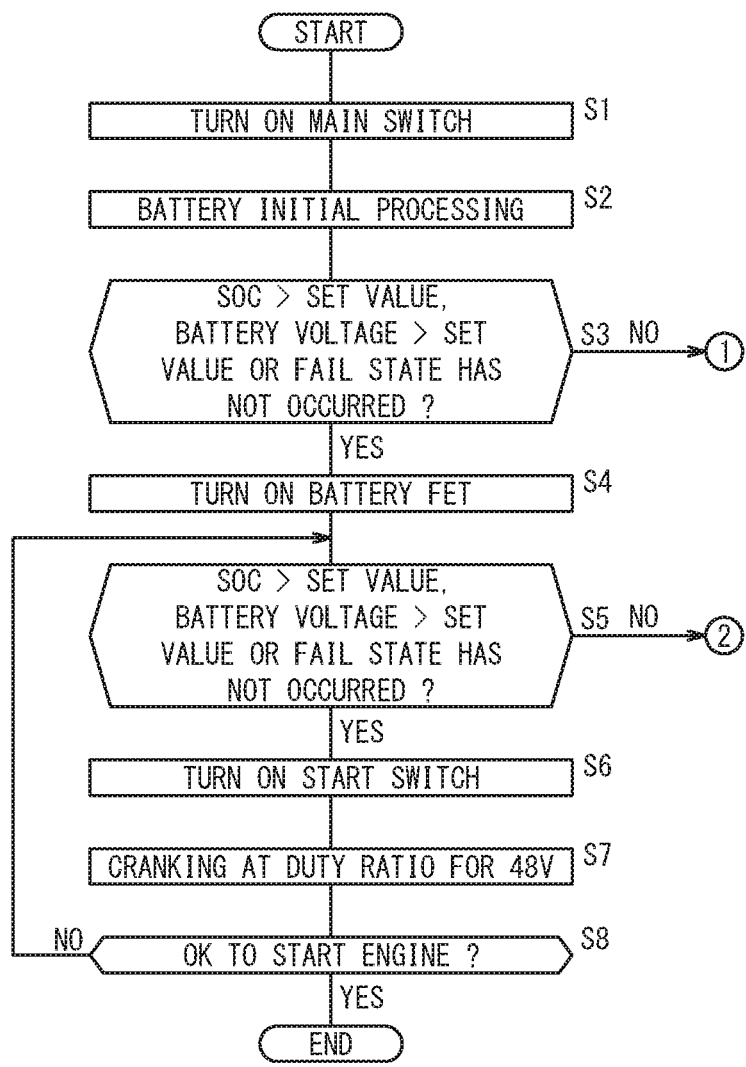
FIG. 4 is a flowchart for explaining an engine starting operation by the control device of FIGS. 1 to 3.
Figure 5:
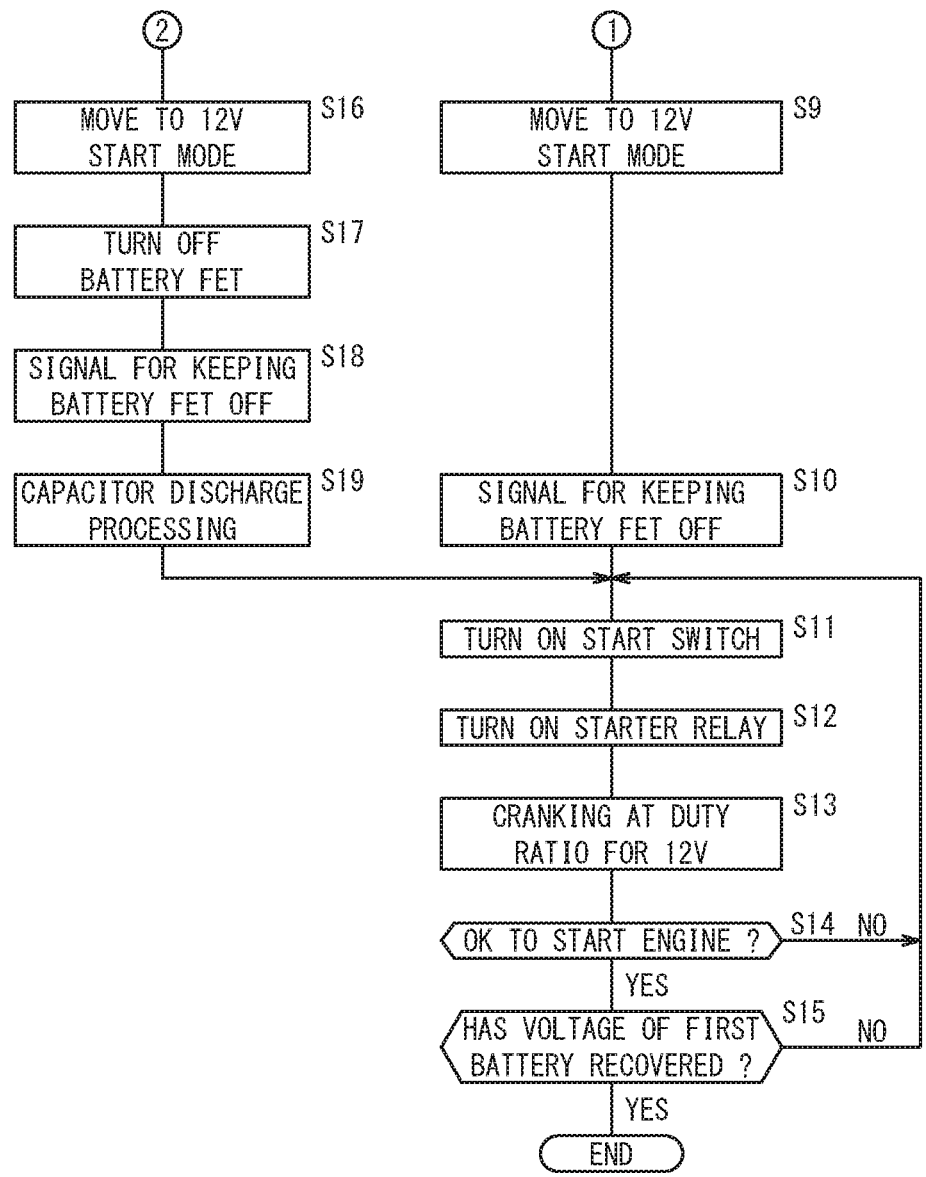
FIG. 5 is a flowchart for explaining a starting operation of an engine by the control device of FIGS. 1 to 3.

As a result, when the engine 24 is started by driving the AC generator 14 (step S8 in FIG. 4: YES), the processing by the control device 10A is completed. On the other hand, when the engine 24 cannot be started even if the AC generator 14 is driven (the cranking is unsuccessful, the step S8: NO), the control device 10A returns to the determination processing of step S5, and performs the processing in steps S6 and S7 again.

On the other hand, if it is determined in step S3 that the notified remaining capacity is less than the set value, the notified voltage value is less than the set value, or the failed state of the first battery 16 has occurred (Step S3: NO), in step S9 of FIG. 5, the startability determination unit 66 determines that the engine 24 cannot be started under the current remaining capacity of the first battery 16, the current voltage value of the first battery 16, or the current state of the first battery 16. Upon receiving the determination result, the ECU 26 determines to start the engine 24 by the DC voltage of the second battery 22.

In step S10, the ECU 26 confirms with the BMU 28 via the CAN communication line 36 whether or not the FET of the FET circuit 32 is the off state. In this case, since the FET of the FET circuit 32 is held in the off state, the BMU 28 transmits a holding signal indicating that the FET is kept in the off state to the ECU 26 via the CAN communication line 36.

In the next step S11, when the driver turns on the start switch, in step S12, the ECU 26 supplies an excitation signal to the electromagnetic coil 54. As a result, the normally open contact 56 of the starter relay 46 is closed, so that the second battery 22 can supply electric power to the ECU 26 via the normally open contact 56, the diode 48, and the line 35.

In the next step S13, the ECU 26 drives the AC generator 14 by the electric power supplied from the second battery 22. Here, the processing of step S13 will be described with reference to FIGS. 6 and 7B.

Figure 7B:
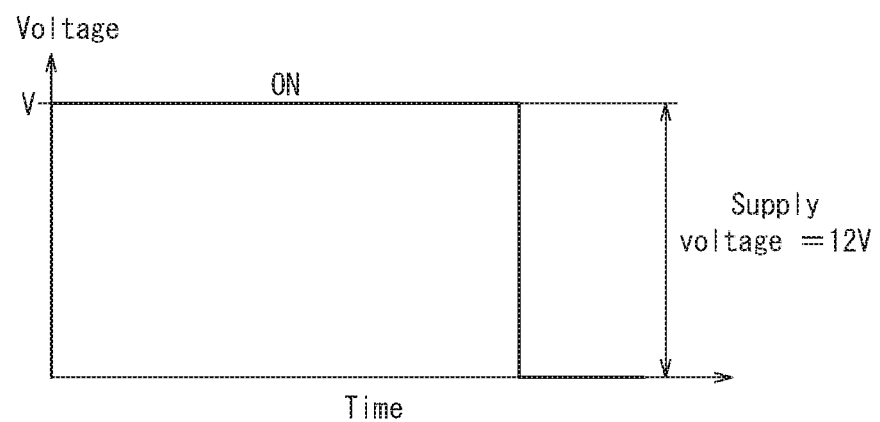
FIG. 7B is a timing chart when the duty ratio is 100% at 12V start.

As shown in FIG. 7B, when the DC voltage of the second battery 22 is V=12 V and the FETs 76 and 78 are turned on at a duty ratio of 100% as indicated by the solid line, a DC voltage (average value) of 12 V×1.00=12 V is supplied to (the resistor 80 and coil 82 of) the AC generator 14. That is, in the first embodiment, when a DC voltage of 12 V is supplied from the second battery 22 to the inverter circuit 64, driving of the AC generator 14 is controlled with the average value of the supply voltage of 12 V at the duty ratio of 100%.

As a result, the engine 24 is started by the driving of the AC generator 14 (step S14: YES in FIG. 5), and thereafter when the first battery 16 recovers to a voltage value (for example, 48 V) exceeding a predetermined value (step S15: YES), the processing of the control device 10A is completed. On the other hand, when the engine 24 cannot be started even if the AC generator 14 is driven (if the cranking is unsuccessful, NO in step S14), the control device 10A returns to step S11 and repeats the processing in steps S12 and S13.

Even if the engine 24 is once started (step S14: YES), if the voltage value of the first battery 16 does not recover (step S15: NO), the engine 24 stops. In this case, the control device 10A returns to step S11 and executes the processing of steps S12 and S13 again.

On the other hand, in step S5 of FIG. 4, in the case where the notified remaining capacity is less than the set value, the notified voltage value is less than the set value, or the failed state of the first battery 16 occurs (Step S5: NO), in step S16 of FIG. 5, the startability determination unit 66 determines that the start of the engine 24 by the first battery 16 has been tried many times but the engine 24 cannot be started, and that the engine 24 cannot be started in the current remaining capacity of the one battery 16, the current voltage value of the first battery 16, or the current state of the first battery 16. In response to this determination result, the ECU 26 decides to start the engine 24 by the DC voltage of the second battery 22 instead of the first battery 16.

In the next step S17, the ECU 26 instructs the BMU 28 to switch the FET of the FET circuit 32 from on to off via the CAN communication line 36. Upon receiving a command from the ECU 26, the FET circuit 32 of the BMU 28 turns the FET from on to off, and cuts off the power supply from the first battery 16 to the ECU 26. In the next step S18, the BMU 28 transmits a holding signal indicating that the FET is turned off and held in the off state, to the ECU 26 via the CAN communication line 36.

In the next step S19, the electric charge due to the DC voltage of the first battery 16 accumulated in the AC generator 14 is discharged via the discharging unit 70 shown in FIGS. 1 to 3. In this case, the ECU 26 monitors whether or not the voltage value detected by the voltage sensor 58 has decreased to the voltage value at the time when the discharging unit 70 has sufficiently discharged the electric charge.

After the ECU 26 determines that the electric charge has been sufficiently discharged, the control device 10A executes the processing of steps S11 to S15. As a result, electric power is supplied from the second battery 22 to the ECU 26 via the normally open contact 56, the diode 48, and the line 35. By supplying power from the second battery 22, the AC generator 14 can be driven to start the engine 24.

As described above, in the control device 10A according to the first embodiment, the control device 10A according to the first embodiment includes a diode as a backflow prevention unit for preventing the current flowing from the first battery 16 from flowing back to the second battery 22 48. The first battery 16 is connected via the line 35 to the AC generator 14 as a driving electric motor, while the second battery 22 is connected to the line 35 via the diode 48. The first battery 16 and the second battery 22 have rated values of different DC voltages and power is supplied from the first battery 16 or the second battery 22 having different rated values to the AC generator 14 to start the engine 24.

In this way, when one of the batteries is reduced in power, the engine 24 can be directly started by supplying electric power from the other battery to the AC generator 14 via the line 35. This eliminates the necessity of providing a boost converter for boosting the voltage of the auxiliary battery and a starter motor separately from the auxiliary motor as in the prior art. As a result, it is possible to realize space saving of the control device 10A while suppressing costs. In addition, the diode 48 can prevent the current from the high voltage first battery 16 from flowing into the low voltage second battery 22 via the line 35.

Further, in the control device 10A according to the first embodiment, the first battery 16 and the second battery 22 have different rated voltage values. In this case, the second battery 22 is a battery (12 V battery) having a lower voltage than the first battery 16 (48 V battery). The average value (12 V) of the supply voltage from the first battery 16 to the AC generator 14 and the average value (12 V) of the supply voltage from the second battery 22 to the AC generator 14 are set based on the duty ratio for driving the AC generator 14. Further, the engine 24 is started by supplying power from the first battery 16 or the second battery 22 with different rated values to the AC generator 14.

Thus, by prioritizing the starting of the engine 24 by the high voltage first battery 16, it is possible to suppress the frequency of starting the engine 24 by the low voltage second battery 22. As a result, it is possible to prevent the second battery 22 from running out. On the other hand, when the first battery 16 is reduced in power, by supplying power from the second battery 22 to the AC generator 14, the engine 24 can be started.

Further, by driving the AC generator 14 with the duty ratio, even when the battery has a rated value of different DC voltage, the engine 24 can be started. That is, when the first battery 16 is a high-voltage battery of 48 V type, a supply voltage with an average value of 12 V is supplied to the AC generator 14 at a duty ratio of 25%, and the engine 24 can be started. On the other hand, when the second battery 22 is a 12V low voltage battery, a supply voltage with an average value of 12 V is supplied to the AC generator 14 at a duty ratio of 100%, and the engine 24 can be started.

Here, the effect of the control device 10A according to the first embodiment will be described in more detail. By including the above configuration, the control device 10A can start the engine 24 with a simple structure when starting the engine 24 with both the first battery 16 and the second battery 22 having rated values of different voltages. Further, it is not necessary to provide a dedicated driving electric motor even for a hybrid vehicle having two batteries with different rated voltages, and it is possible to use the same parts as those of a conventional internal combustion engine vehicle.

Specifically, in the conventional configuration of driving the driving electric motor while stepping up the voltage value of the low-voltage battery using the inverter, since the driving electric motor is driven by the power of the low-voltage battery, more power is required Become.

On the other hand, in the control device 10A according to the first embodiment, power is supplied to the AC generator 14 without boosting the second battery 22, and the engine 24 is started, and therefore power consumption of the second battery 22 is suppressed to start the engine 24

Further, in the control device 10A, by controlling the duty ratio of the first battery 16, it is possible to use conventional components used in a vehicle having an internal combustion engine to a hybrid vehicle having two batteries with different voltage ratings. This makes it possible to achieve common parts between a hybrid vehicle having two batteries with different rated voltages and a vehicle having an internal combustion engine.

In the above explanation, the duty ratio is set to a fixed value. However, in accordance with the state of the hybrid vehicle 12, for example, a supply voltage with an average value of 12 V may be supplied at a duty ratio between 20% and 30% from the first battery 16 to the AC generator 14.

Further, the allowable voltage of the AC generator 14 is set, for example, within the range of 12 V to 48 V, and a voltage may be supplied to the AC generator 14 from the first battery 16 at a duty ratio of 20% to 80% according to the state of the hybrid vehicle 12 such as an engine speed and a vehicle speed, to drive the AC generator 14. Specifically, a voltage is supplied to the AC generator 14 from the first battery 16 at a duty ratio of 20% to 30% to start up the AC generator 14. Thereafter, when the engine 24 rotates at high speed while the hybrid vehicle 12 is traveling, a voltage is supplied from the first battery 16 to the AC generator 14 at a duty ratio of 20% to 80% that is higher than that at the starting time, the AC generator 14 is driven to assist the rotation of the crankshaft.

Furthermore, the AC generator 14 may be driven by both the first battery 16, which is a high voltage battery of 48 V type, and the second battery 22 which is a low voltage battery of 12 V type.

Further, the control device 10A can also obtain the following effects. That is, the control device 10A includes a startability determination unit 66 that determines whether or not the state of the first battery 16 or the second battery 22 is in a state capable of starting the engine 24, and in the case where the startability determination unit 66 determines that one of the batteries cannot start the engine 24, the other battery supplies electric power to the AC generator 14 to start the engine 24.

As a result, when the startability determination unit 66 determines that one of the batteries cannot start the engine 24, the engine 24 is started by the other battery. Therefore, even if the engine 24 cannot be started due to the condition of the one of the batteries, it is possible to start the engine 24 by supplying electric power from the other battery to the AC generator 14.

Specifically, for one battery, if the remaining capacity is below the required capacity, the voltage value is below the set value, or in the failed state, the start/unavailability determination unit 66 determines that the engine 24 cannot be started, and the engine 24 is started with the other battery. Therefore, even when one of the batteries cannot start the engine 24 due to the reduced power or failed state, the engine 24 can be started by supplying power from the other battery to the AC generator 14.

In addition, the second battery 22 is a battery having a voltage lower than that of the first battery 16, and in the normal state, to start the engine 24 the first battery 16 supplies electric power to the AC generator 14 in preference to the second battery 22, On the other hand, if the startability determination unit 66 determines that the first battery 16 cannot start the engine 24, the second battery 22 supplies electric power to the AC generator 14 to start the engine 24.

Also in this case, by prioritizing the start of the engine 24 using the high voltage first battery 16, it is possible to suppress the frequency of starting the engine 24 by the low voltage second battery 22. As a result, it is possible to prevent the second battery 22 from running out. On the other hand, when the first battery 16 is depleted, by supplying power from the second battery 22 to the AC generator 14, the engine 24 can be started.

The average value (12 V) of the supply voltage from the first battery 16 to the AC generator 14 and the average value (12 V) of the supply voltage from the second battery 22 to the AC generator 14 are determined based on the duty ratio for driving the AC generator 14.

By driving the AC generator 14 based on the duty ratio as described above, the engine 24 can be started even with batteries having rated values of different DC voltages. That is, when the first battery 16 is a high-voltage battery of 48 V type, a supply voltage with an average value of 12 V is supplied to the AC generator 14 at a duty ratio of 25%, and the engine 24 can be started. On the other hand, when the second battery 22 is a 12V low voltage battery, a supply voltage with an average value of 12 V is supplied to the AC generator 14 at a duty ratio of 100%, and the engine 24 can be started.

Further, the control device 10A further includes a diode 48 as a backflow preventing unit for preventing the current flowing from the first battery 16 from flowing back to the second battery 22. Thereby, it is possible to prevent the current from the high voltage first battery 16 from flowing into the low voltage second battery 22.

When the startability determination unit 66 determines that the first battery 16 cannot start the engine 24, the control device 10A further includes a discharging unit 70 for discharging the electric charge caused by the DC voltage of the first battery 16 accumulated in the AC generator 14. Even if the rated values of the DC voltages differ between the first battery 16 and the second battery 22, by discharging the electric charge in the AC generator 14 due to the first battery 16 by the discharging unit 70, it is possible to start the engine 24 by supplying electric power from the second battery 22 to the AC generator 14.

The control device 10A further includes a voltage sensor 58 as detection unit for checking whether the electric charge has been discharged by the discharging unit 70. By using the voltage sensor 58, it is possible to prevent different unintentional DC voltages from being applied to the AC generator 14.

In this case, the control device 10A further includes an ECU 26 that drives and controls the AC generator 14 and a BMU 28 that monitors the state of the first battery 16, and the voltage sensor 58 is provided in the ECU 26 or the BMU 28. This eliminates the need to provide an independent voltage supply unit externally for driving the voltage sensor 58. In addition, there is no need to provide a harness or the like for taking in the detection result of the voltage sensor 58, thereby reducing the number of parts. Since the CAN communication line 36 is originally provided in the hybrid vehicle 12, it goes without saying that addition of a harness or the like is unnecessary. Therefore, even if the voltage sensor 58 is provided in either the ECU 26 or the BMU 28, it is possible to notify the detected voltage value via the CAN communication line 36.

Description of Second Embodiment

Figure 8:
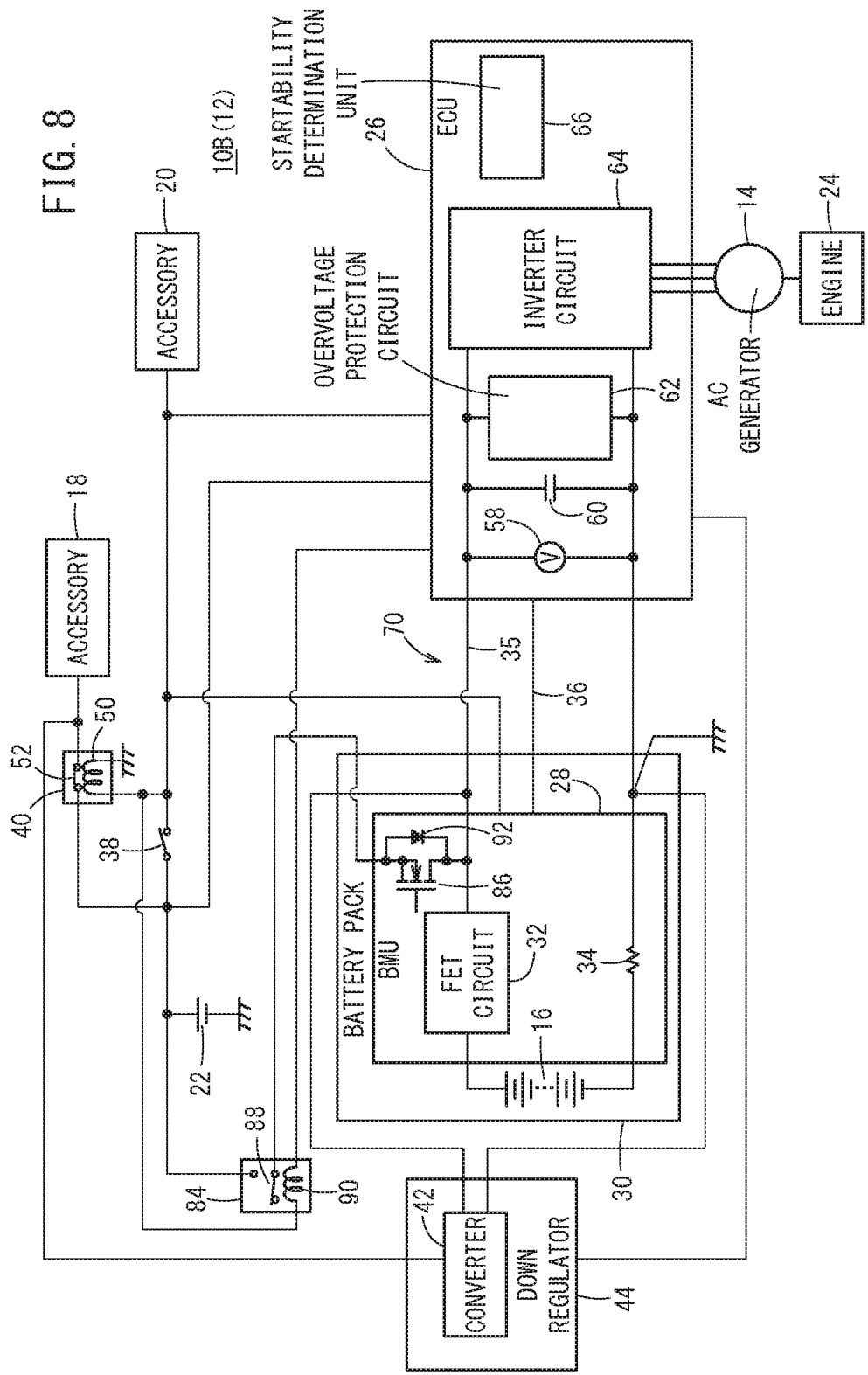
FIG. 8 is a circuit diagram of a hybrid vehicle including a control device according to a second embodiment.

A control device 10B according to a second embodiment will be described with reference to FIG. 8. The same components as those of the control device 10A (see FIGS. 1 to 7B) according to the first embodiment are denoted by the same reference numerals, the detailed description thereof will be omitted.

The control device 10B is different from the control device 10A in that the positive electrode side of the second battery 22 is connected to the line 35 via the transfer relay 84 and the FET 86 in the BMU 28. The transfer relay 84 has a changeover contact 88 and an electromagnetic coil 90. The changeover contact 88 connects the second battery 22 and the FET 86. Further, the electromagnetic coil 90 connects the main switch 38 and the ECU 26.

In the control device 10B, when an excitation signal is supplied from the ECU 26 to the electromagnetic coil 90, the second battery 22 and the FET 86 are connected by the changeover contact 88. When a command to turn on the FET 86 is transmitted from the ECU 26 to the BMU 28 via the CAN communication line 36, the BMU 28 turns on the FET 86 according to this command. As a result, electric power can be supplied from the second battery 22 to the ECU 26 via the changeover contact 88, the FET 86 and the line 35. As a result, it is possible to drive the AC generator 14 and start the engine 24.

As described above, also in the control device 10B according to the second embodiment, by supplying power from the second battery 22 to the ECU 26 and driving the AC generator 14, the engine 24 can be started. As a result, also in the control device 10B, the effect of the control device 10A according to the first embodiment can be easily obtained. Further, by interposing the FET 86 between the second battery 22 and the line 35, the FET 86 functions as a backflow prevention unit similarly to the above-described diode 48 (see FIGS. 1 to 3). Since the diode 92 is connected in parallel to the FET 86, it is also possible to make the diode 92 function as a backflow prevention unit.

Description of Third Embodiment

Figure 9:
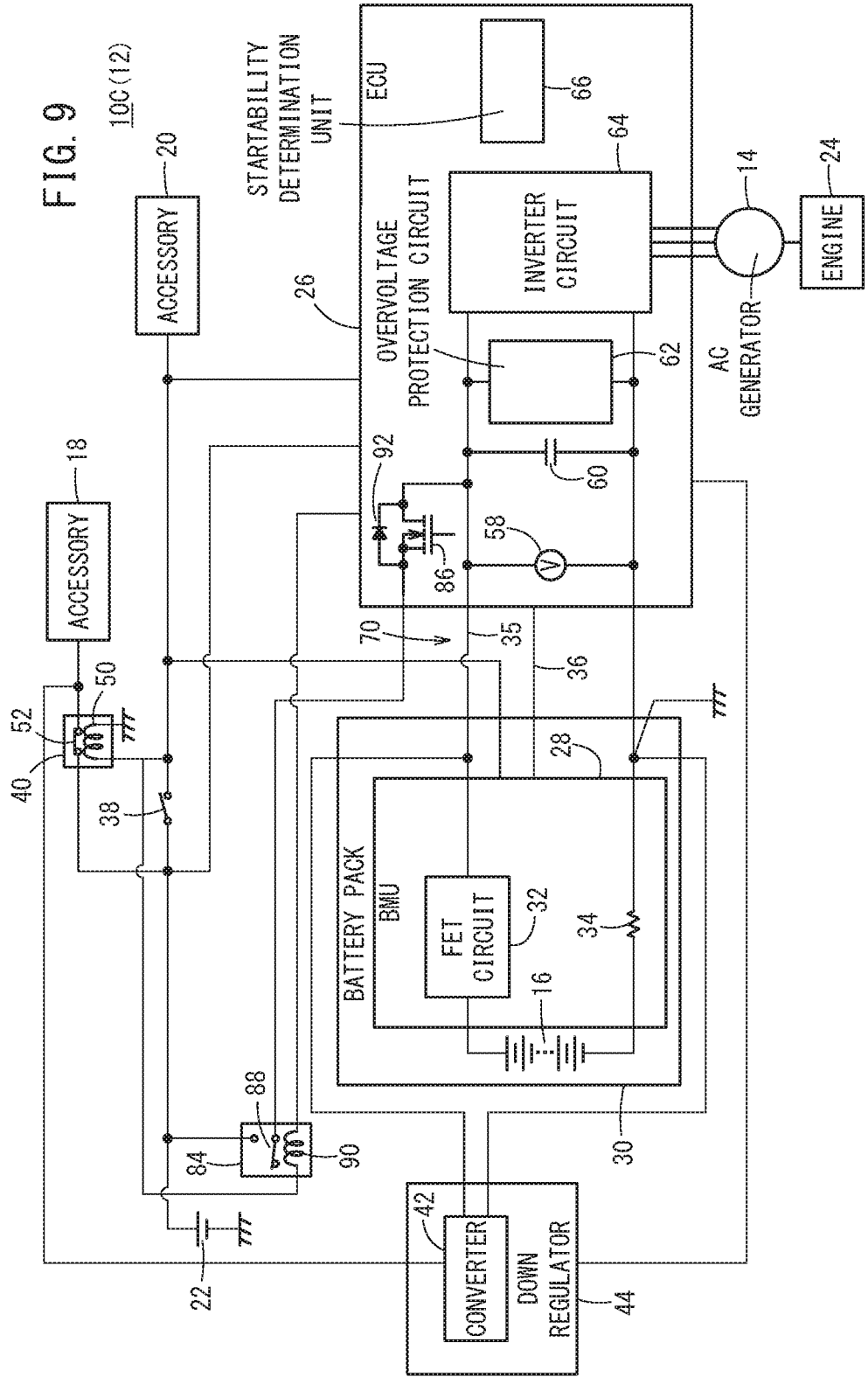
FIG. 9 is a circuit diagram of a hybrid vehicle including a control device according to a third embodiment.

A control device 10C according to a third embodiment will be described with reference to FIG. 9.

The control device 10C is different from the control device 10B (see FIG. 8) according to the second embodiment in that the FET 86 is disposed in the ECU 26. In this case, the FET 86 is connected to a portion near the voltage sensor 58 and the capacitor 60 in the line 35 in the ECU 26. In this manner, also in the control device 10C, by supplying electric power from the second battery 22 to the AC generator 14 via the changeover contact 88, the FET 86 and the line 35, the AC generator 14 is driven to start the engine 24. Therefore, also in the control device 10C, the respective effects of the control devices 10A, 10B according to the first and second embodiments can be easily obtained.

Description of Fourth Embodiment

Figure 10:
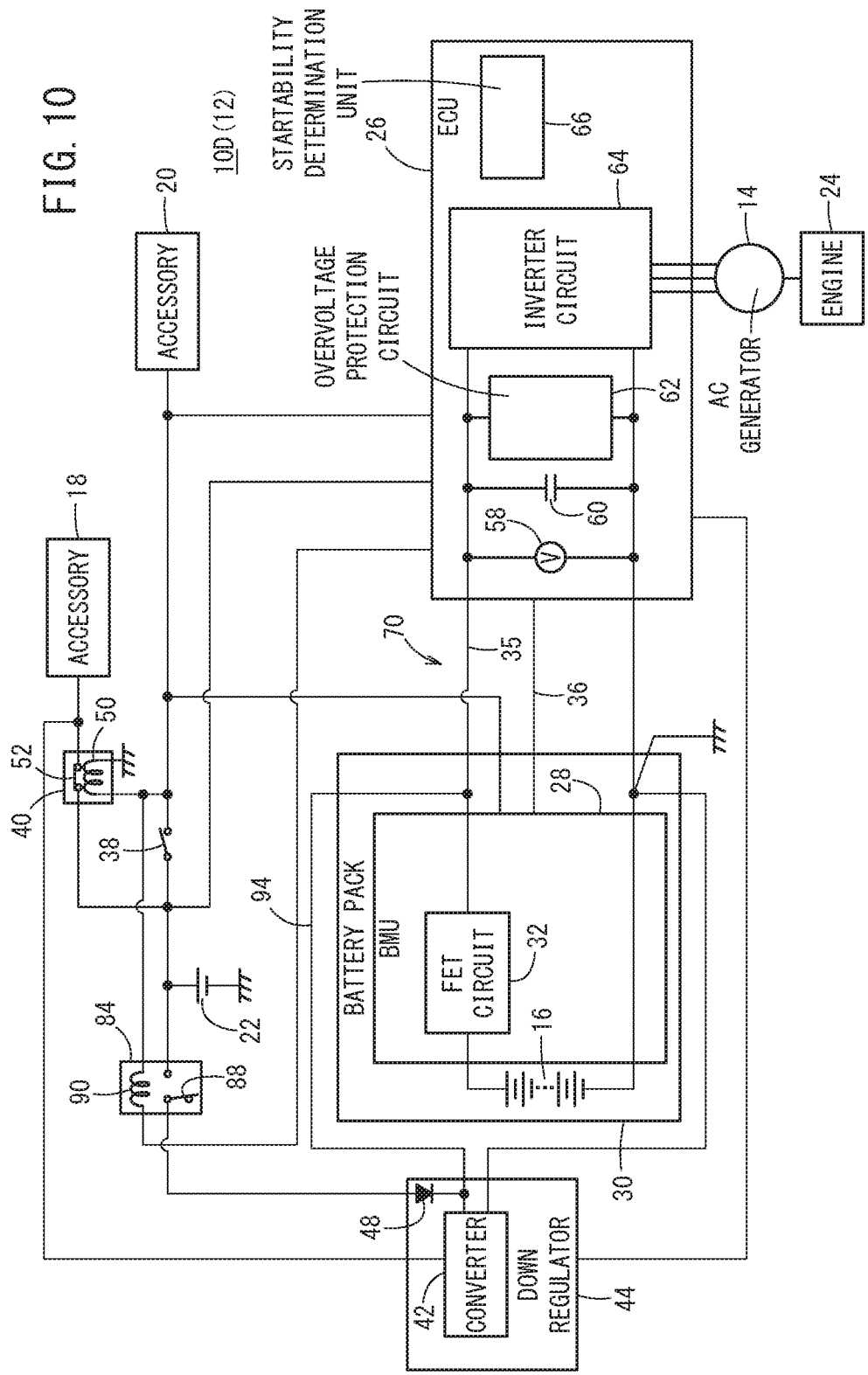
FIG. 10 is a circuit diagram of a hybrid vehicle including a control device according to a fourth embodiment.

A control device 10D according to a fourth embodiment will be described with reference to FIG. 10.

The control device 10D is different from the control devices 10A to 10C (see FIGS. 1 to 9) according to the first to third embodiments in that the diode 48 as a backflow prevention unit is disposed in the down regulator 44. In this case, the anode of the diode 48 is connected to the changeover contact 88 of the transfer relay 84 and the cathode is connected in the down regulator 44 to the line 94 connecting between the converter 42 and the line 35.

In the control device 10D, power is supplied from the second battery 22 to the ECU 26 via the changeover contact 88, the diode 48, and the lines 94 and 35. Even in this case, electric power from the second battery 22 is supplied to the AC generator 14, the AC generator 14 is driven, and the engine 24 can be started. Thus, the respective effects of the control devices 10A to 10C according to the first to third embodiments can be easily obtained.

Description of Fifth Embodiment

Figure 11:
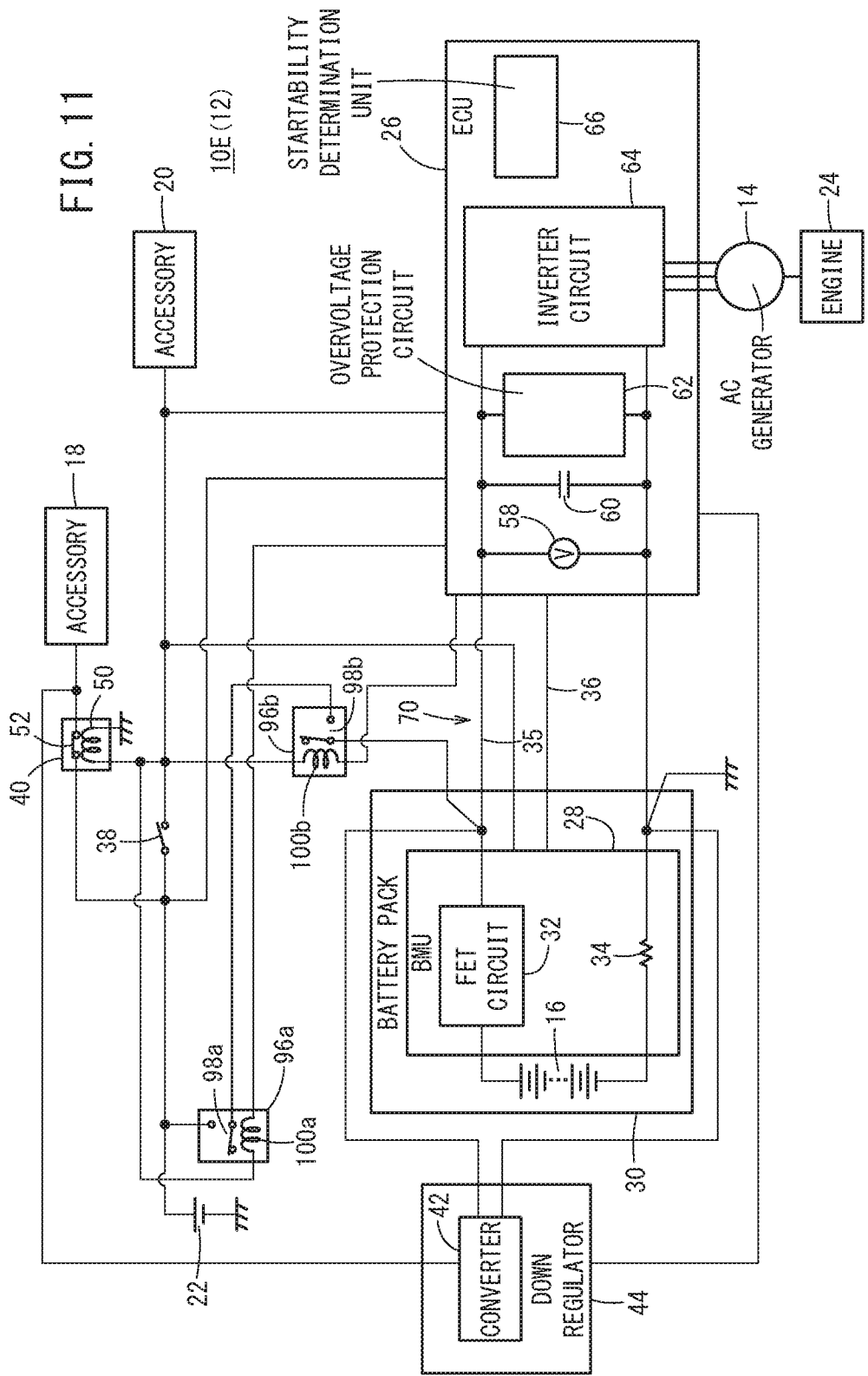
FIG. 11 is a circuit diagram of a hybrid vehicle including a control device according to a fifth embodiment.

The control device 10E according to a fifth embodiment will be described with reference to FIG. 11.

In the control device 10E, the positive electrode side of the second battery 22 is connected to the line 35 via two transfer relays 96a, 96b. The control device 10E is different from the control devices 10A to 10D (see FIGS. 1 to 10) in that the transfer relays 96a, 96b function as a backflow prevention unit like the aforementioned diode 48 (FIGS. 1 to 3 and 10) according to the first to fourth embodiments.

The transfer relays 96a, 96b have the same structure as the above-described transfer relay 84 (see FIGS. 8 to 10), and have changeover contacts 98a, 98b and electromagnetic coils 100a and 100b, respectively. In this case, the transfer relay 96a and the transfer relay 96b are sequentially connected from the second battery 22 to the line 35.

In the transfer relay 96a, the changeover contact 98a connects between the second battery 22 and the changeover contact 98b of the transfer relay 96b. Further, the electromagnetic coil 100a connects the main switch 38 and the ECU 26. On the other hand, in the transfer relay 96b, the changeover contact 98b connects the changeover contact 98a of the transfer relay 96a and the line 35. Further, the electromagnetic coil 100b connects the main switch 38 and the ECU 26.

When an excitation signal is supplied from the ECU 26 to the electromagnetic coil 100a in the control device 10E, the second battery 22 and the changeover contact 98b of the transfer relay 96b are connected by the changeover contact 98a. When an excitation signal is supplied from the ECU 26 to the electromagnetic coil 100b, the changeover contact 98b connects the changeover contact 98a of the transfer relay 96a and the line 35.

As a result, the second battery 22 can supply electric power to the ECU 26 via the changeover contacts 98a, 98b and the line 35. As a result, it is possible to drive the AC generator 14 and start the engine 24.

As described above, in the control device 10E according to the fifth embodiment, since the two transfer relays 96a and 96b function as backflow prevention unit like the diodes 48, the effects of the control devices 10A to 10D according to the first to fourth embodiments can be easily obtained.

Description of Sixth Embodiment

Figure 12:
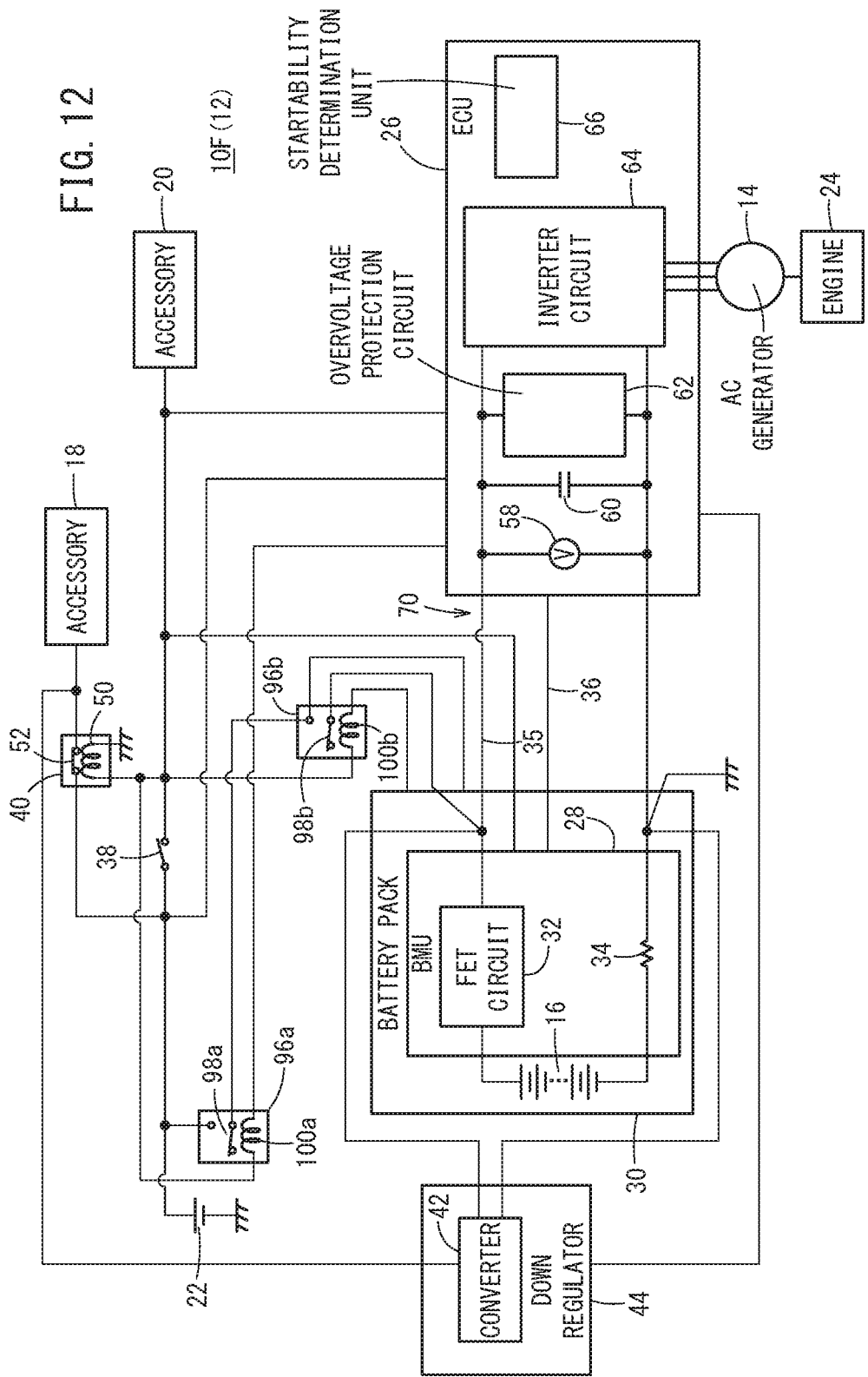
FIG. 12 is a circuit diagram of a hybrid vehicle including a control device according to a sixth embodiment.

A control device 10F according to a sixth embodiment will be described with reference to FIG. 12.

The control device 10F is different from the control device 10E (see FIG. 11) according to the fifth embodiment in that the electromagnetic coil 100b constituting the transfer relay 96b on the line 35 side connects the main switch 38 and the battery pack 30.

Also in this case, when the excitation signal is supplied from the ECU 26 to the electromagnetic coil 100a, the second battery 22 and the changeover contact 98b of the transfer relay 96b are connected by the changeover contact 98a, while the exciting signal is supplied from (the BMU 28 of) the battery pack 30 to the electromagnetic coil 100b, the changeover contact 98b connects the changeover contact 98a of the transfer relay 96a and the line 35.

Therefore, the second battery 22 supplies electric power to the ECU 26 via the changeover contacts 98a, 98b and the line 35, and drives the AC generator 14 to start the engine 24.

As described above, in the control device 10F according to the sixth embodiment, effects similar to those of the control device 10E according to the fifth embodiment can be easily obtained.

Description of Seventh Embodiment

Figure 13:
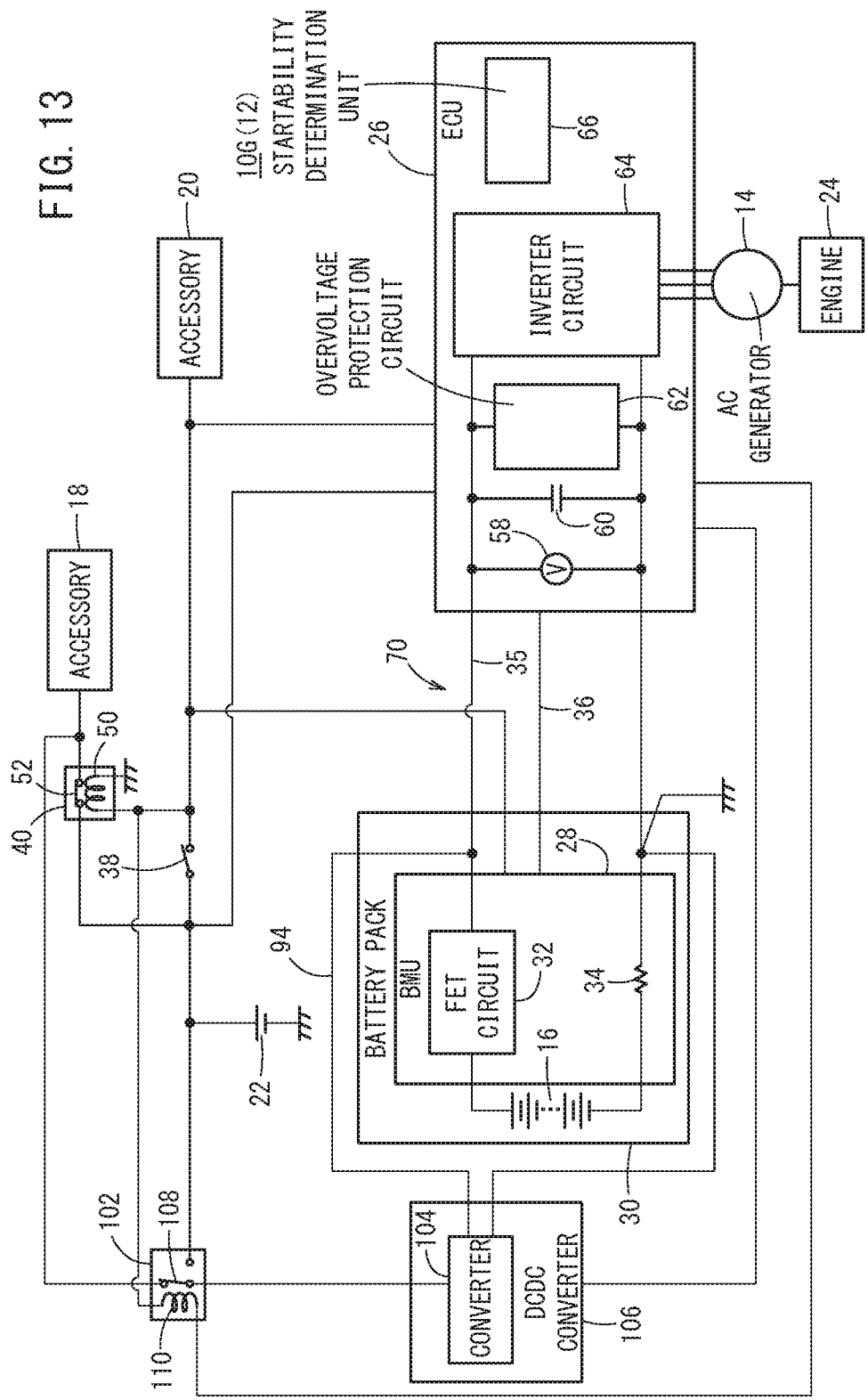
FIG. 13 is a circuit diagram of a hybrid vehicle including a control device according to a seventh embodiment.

A control device 10G according to a seventh embodiment will be described with reference to FIG. 13.

The control device 10G is different from the control devices 10A to 10F. (see FIGS. 1 to 12) according to the first to six embodiments in that, in place of the down regulator 44, the starter relay 46, and the diode 48 (see FIGS. 1 to 3), the DC/DC converter 106 having the transfer relay 102 and the converter 104 are disposed.

The transfer relay 102 has a changeover contact 108 and an electromagnetic coil 110. The changeover contact 108 connects the second battery 22 and the converter 104. Further, the electromagnetic coil 110 connects the main switch 38 and the ECU 26.

The DC/DC converter 106 is a buck-boost converter that boosts the DC voltage (12 V) of the second battery 22 to a high voltage of 48 V while stepping down the high voltage of 48 V to 12 V. The DC/DC converter 106 is disposed in place of the above-described down regulator 44.

In the control device 10G, an excitation signal is supplied from the ECU 26 to the electromagnetic coil 110, and the second battery 22 and the converter 104 are connected to each other through the changeover contact 108, whereby the second battery 22 supplies a DC voltage of 12 V to the converter 104 via the changeover contact 108. The converter 104 boosts 12 V to 48 V (the same voltage value as the DC voltage of the first battery 16) and supplies the boosted DC voltage to the ECU 26 via the lines 94, 35. As a result, the AC generator 14 can be driven with the power corresponding to the DC voltage of 48 V, and the engine 24 can be started.

As described above, in the control device 10G according to the seventh embodiment, the converter 104 boosts the DC voltage of the second battery 22 and supplies power corresponding to the boosted DC voltage to the AC generator 14. As a result, the AC generator 14 can be driven and the engine 24 can be started similarly to the case where the AC generator 14 is driven by the electric power of the first battery 16.

Description of Eighth Embodiment

Figure 14:
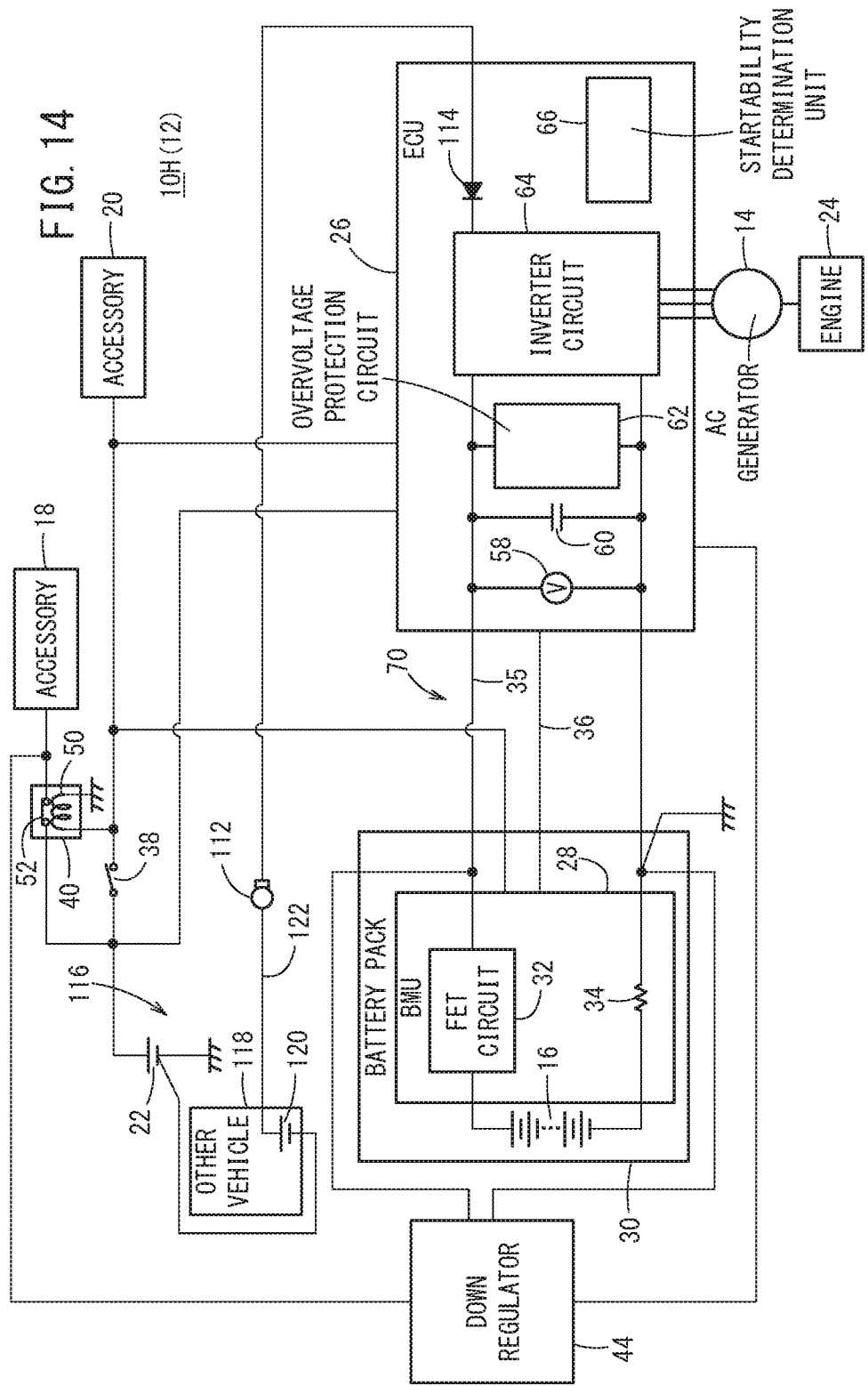
FIG. 14 is a circuit diagram of a hybrid vehicle including a control device according to an eighth embodiment.

A control device 10H according to an eighth embodiment will be described with reference to FIG. 14.

The eighth embodiment shows a case where electric power is supplied from the outside to the AC generator 14 to drive the AC generator 14 to start the engine 24. This embodiment is applicable to the case where, for example, the engine 24 is started using an external battery because the remaining capacity of the second battery 22 is small in spite of an attempt to start the engine 24 by the second battery 22 in place of the first battery 16.

Specifically, the hybrid vehicle 12 is provided with an external connection terminal 112 (external power supply unit), and the external connection terminal 112 is connected to the inverter circuit 64 via a diode 114 in the ECU 26. In this case, the second battery 22 and the external connection terminal 112 constitute the second battery unit 116. The external connection terminal 112 may be an external power connection portion such as a terminal block provided in the peripheral circuit of the second battery 22. Therefore, the external connection terminal 112 is provided separately from the terminal of the second battery 22. It should be noted that the diode 114 functions as a reverse current preventing unit similarly to the above-described diode 48 (see FIGS. 1 to 3).

For the battery 120 of the other vehicle 118, its positive electrode side is connected to the external connection terminal 112 via the booster cable 122, and the negative electrode side of the battery 120 is grounded. Thus, even when the remaining capacity of the second battery 22 is small, electric power can be supplied from the battery 120 to the inverter circuit 64 via the booster cable 122, the external connection terminal 112, and the diode 114. As a result, the AC generator 14 can be driven with the supplied electric power to start the engine 24.

As described above, in the control device 10H according to the eighth embodiment, even when the first battery 16 and the second battery 22 are reduced in power, the engine 24 can be started by the external battery 120 (external power).

Description of Ninth Embodiment

A control device 10I according to a ninth embodiment will be described with reference to FIG. 15.

The control device 10I according to the ninth embodiment is different from the control device 10H (see FIG. 14) according to the eighth embodiment in that a diode 114 connected to the external connection terminal 112 is disposed in the BMU 28. In this case, the anode of the diode 114 is connected to the external connection terminal 112, and the cathode is connected to the line 35.

Also in the ninth embodiment, the positive electrode side of the battery 120 of the other vehicle 118 is connected to the external connection terminal 112 via the booster cable 122, and the negative electrode side of the battery 120 is grounded. Even in this case, if the remaining capacity of the second battery 22 is small, electric power can be supplied from the battery 120 to the ECU 26 via the booster cable 122, the external connection terminal 112, the diode 114, and the line 35. As a result, the AC generator 14 can be driven with the supplied electric power to start the engine 24. As described above, the control device 10I according to the ninth embodiment also has the same advantages as the control device 10H according to the eighth embodiment.

Although the present invention has been described with reference to the preferred embodiments, the technical scope of the present invention is not limited to the description of the above embodiments. It will be apparent to those skilled in the art that various modifications or improvements can be added to the above embodiments. It is obvious from the description of the scope of the claims that modes with such

The invention claimed is:

1. A control device of a hybrid vehicle, comprising:
a driving electric motor,
a first battery for supplying electric power to the driving electric motor,
a second battery for supplying electric power to a plurality of accessories, wherein:
an engine of the hybrid vehicle is started by the driving electric motor,
the control device further comprises a backflow prevention unit configured to prevent current flowing from the first battery from flowing back into the second battery,
the first battery is connected to the driving electric motor via a line,
the second battery is connected to the line via the backflow prevention unit,
the first battery and the second battery have rated voltages of different voltages,
the second battery is a battery having a lower voltage than the first battery, and
a voltage converting unit that converts a voltage of the first battery to correspond to a voltage of the second battery, wherein:
the first battery and the second battery comprise different rated voltages, and
at least one of the first battery or the second battery supplies electric power to the driving electric motor to start the engine.

2. The control device of a hybrid vehicle according to claim 1, wherein
an average value of a supply voltage from the first battery to the driving electric motor and an average value of a supply voltage from the second battery to the driving electric motor are determined based on a duty ratio for driving the driving electric motor.

3. The control device of the hybrid vehicle according to claim 1, further comprising a startability determination unit configured to determine whether the first battery or the second battery is in a state capable of starting up the engine,
wherein based on a determination by the startability determination unit that the engine cannot be started by one of the batteries, electric power is supplied from the other of the batteries to the driving electric motor to start the engine.

4. The control device of the hybrid vehicle according to claim 3, wherein the startability determination unit determines whether a remaining capacity of the first battery or the second battery is a capacity required for starting up the engine, a voltage value of the first battery or the second battery is lower than a predetermined set value, or the first battery or the second battery is in a failed state, and
based on a determination that the engine cannot be started by one of the batteries because a remaining capacity of the one of the batteries is a capacity required for starting up the engine, a voltage value of the one of the batteries is lower than a predetermined set value, or the one of the batteries is in a failed state, electric power is supplied from the other of the batteries to the driving electric motor to start the engine.

5. The control device of the hybrid vehicle according to claim 3,
wherein the first battery in normal times supplies electric power to the driving electric motor in preference to the second battery to start the engine, and
based on a determination by the startability determination unit that the engine cannot be started by the first battery, electric power is supplied from the second battery to the driving electric motor to start the engine.

6. The control device of a hybrid vehicle according to claim 2, wherein
the driving electric motor is driven by supplying, to the driving electric motor from the first battery, a voltage at a duty ratio higher than a duty ratio at a time of starting the engine.

7. The control device of the hybrid vehicle according to claim 6, wherein
the driving electric motor is driven by supplying the driving electric motor from the first battery with the voltage at a duty ratio higher than the duty ratio at the time of starting the engine, depending on an engine rotating speed or a vehicle speed of the hybrid vehicle.

8. The control device of the hybrid vehicle according to claim 1, further comprising
a startability determination unit configured to determine whether the first battery or the second battery is in a state capable of starting up the engine, and
a discharging unit configured to discharge electric charge caused by a voltage of the first battery accumulated in the driving electric motor based on a determination by the startability determination unit that the engine cannot be started by the first battery.

9. The control device of the hybrid vehicle according to claim 8, further comprising
a detection unit configured to confirm whether or not the electric charge has been discharged by the discharging unit.

10. The control device of the hybrid vehicle according to claim 9, further comprising
a control device configured to drive and control the driving electric motor, and a battery management unit configured to monitor a state of the first battery,
wherein the detection unit is provided in the control unit or the battery management unit.

11. The control device of the hybrid vehicle according to claim 1, wherein
a second battery unit is formed of the second battery and a peripheral circuit of the second battery, and
the second battery unit includes an external power supply unit configured to supply electric power from outside to the driving electric motor separately from a terminal of the second battery.

12. The control device of the hybrid vehicle according to claim 1, wherein
the first battery or the second battery having different rated voltages supplies electric power to the driving electric motor by supplying, to start the engine, the voltage from the second battery.

13. The control device of the hybrid vehicle according to claim 1, wherein
the first battery has a rated voltage more than double a rated voltage of the second battery.

* * * * *